US008688275B1

(12) United States Patent
LaFary et al.

(10) Patent No.: US 8,688,275 B1
(45) Date of Patent: Apr. 1, 2014

(54) POSITIVE AND NEGATIVE OBSTACLE AVOIDANCE SYSTEM AND METHOD FOR A MOBILE ROBOT

(71) Applicant: Adept Technology, Inc., Pleasanton, CA (US)

(72) Inventors: Matthew LaFary, Peterborough, NH (US); George Paul, Merrimack, NH (US)

(73) Assignee: Adept Technology, Inc., Pleasanton, CA (US)

(*) Notice: Subject to any disclaimer, the term of this patent is extended or adjusted under 35 U.S.C. 154(b) by 0 days.

(21) Appl. No.: 14/001,266

(22) PCT Filed: Jan. 25, 2013

(86) PCT No.: PCT/US2013/023154
§ 371 (c)(1),
(2), (4) Date: Aug. 23, 2013

(87) PCT Pub. No.: WO2013/112842
PCT Pub. Date: Aug. 1, 2013

Related U.S. Application Data

(60) Provisional application No. 61/596,685, filed on Feb. 8, 2012, provisional application No. 61/590,806, filed on Jan. 25, 2012.

(51) Int. Cl.
*G01S 13/88* (2006.01)
*G05B 15/00* (2006.01)
*G05B 19/00* (2006.01)
*G05B 19/18* (2006.01)

(52) U.S. Cl.
USPC ............ 700/255; 700/251; 700/253; 700/254; 700/259; 701/514

(58) Field of Classification Search
None
See application file for complete search history.

(56) References Cited

U.S. PATENT DOCUMENTS

| 4,674,048 A | 6/1987 | Okumura |
| 4,727,492 A | 2/1988 | Reeve et al. |

(Continued)

FOREIGN PATENT DOCUMENTS

| EP | 78357 | 1/2011 |
| JP | 07-281753 A | 10/1995 |
| WO | 2009040777 A2 | 4/2009 |

OTHER PUBLICATIONS

3D Modeling of Indoor Environments by a.pdf (Peter {Biber} and Henrik {Andreasson} and Tom {Duckett} and Andreas {Schilling}, 3D Modeling of Indoor Environments by a Mobile Robot with a Laser Scanner and Panoramic Camera, 2004, Proceedings of the 2004 IEEE/RSJ International Conference on Intelligent Robots and Systems (IROS 2004), pp. 1-6).*

(Continued)

*Primary Examiner* — Khoi Tran
*Assistant Examiner* — Bao Long T Nguyen
(74) *Attorney, Agent, or Firm* — Law Offices of Grady L. White, LLC

(57) ABSTRACT

Embodiments of the present invention provide methods and systems for ensuring that mobile robots are able to detect and avoid positive obstacles in a physical environment that are typically hard to detect because the obstacles do not exist in the same plane or planes as the mobile robot's horizontally-oriented obstacle detecting lasers. Embodiments of the present invention also help to ensure that mobile robots are able to detect and avoid driving into negative obstacles, such as gaps or holes in the floor, or a flight of stairs. Thus, the invention provides positive and negative obstacle avoidance systems for mobile robots.

26 Claims, 11 Drawing Sheets

(56) References Cited

U.S. PATENT DOCUMENTS

| | | | |
|---|---|---|---|
| 4,763,055 | A | 8/1988 | Daggett et al. |
| 5,279,672 | A | 1/1994 | Betker et al. |
| 5,324,948 | A | 6/1994 | Dudar et al. |
| 5,559,696 | A | 9/1996 | Borenstein |
| 5,610,815 | A | 3/1997 | Gudat et al. |
| 5,764,014 | A | 6/1998 | Jakeway et al. |
| 5,897,595 | A | 4/1999 | Hawkins et al. |
| 5,931,875 | A | 8/1999 | Kemner et al. |
| 6,496,755 | B2 | 12/2002 | Wallach et al. |
| 6,580,246 | B2 | 6/2003 | Jacobs |
| 6,667,592 | B2 | 12/2003 | Jacobs et al. |
| 6,748,292 | B2 | 6/2004 | Mountz |
| 6,853,877 | B1 | 2/2005 | Slater et al. |
| 6,895,301 | B2 | 5/2005 | Mountz |
| 7,082,350 | B2 | 7/2006 | Skoog |
| 7,117,068 | B2 | 10/2006 | Critchlow |
| 7,135,991 | B2 | 11/2006 | Slemmer et al. |
| 7,209,803 | B2 * | 4/2007 | Okamoto et al. ............. 700/245 |
| 7,269,479 | B2 * | 9/2007 | Okamoto et al. ............. 700/245 |
| 7,272,467 | B2 | 9/2007 | Goncalves et al. |
| 7,456,596 | B2 | 11/2008 | Goodall et al. |
| 7,532,113 | B2 | 5/2009 | Horvitz et al. |
| 7,650,013 | B2 | 1/2010 | Dietsch et al. |
| 7,693,654 | B1 | 4/2010 | Dietsch et al. |
| 7,729,801 | B2 | 6/2010 | Abromson |
| 7,894,393 | B2 | 2/2011 | Srinivas et al. |
| 7,912,633 | B1 | 3/2011 | Dietsch et al. |
| 8,169,596 | B2 | 5/2012 | Weiss et al. |
| 2002/0049530 | A1 | 4/2002 | Poropat |
| 2003/0030398 | A1 | 2/2003 | Jacobs |
| 2005/0047895 | A1 | 3/2005 | Lert, Jr. |
| 2006/0195226 | A1 | 8/2006 | Matsukawa et al. |
| 2006/0265103 | A1 | 11/2006 | Orita |
| 2007/0112461 | A1 | 5/2007 | Zini et al. |
| 2007/0140821 | A1 | 6/2007 | Garon et al. |
| 2007/0192910 | A1 | 8/2007 | Vu et al. |
| 2007/0294029 | A1 | 12/2007 | D'Andrea et al. |
| 2008/0009969 | A1 | 1/2008 | Bruemmer et al. |
| 2009/0281661 | A1 | 11/2009 | Dooley et al. |
| 2010/0049364 | A1 | 2/2010 | Landry et al. |
| 2010/0094459 | A1 | 4/2010 | Cho et al. |
| 2011/0137457 | A1 | 6/2011 | Zini |
| 2013/0138247 | A1 * | 5/2013 | Gutmann et al. ............. 700/253 |

OTHER PUBLICATIONS iros04.pdf (http://www.aass.oru.se/~han/papers/iros04.html).* perception_3d_navigation.pdf (Jens-Steffen Gutmann, Masaki Fukuchi and Masahiro Fujita, 3D Perception and Environment Map Generation for Humanoid Robot Navigation, Oct. 2008, the International Journal of Robotics Research, pp. 1116-1134).*

Evans. "Help Mate, The Trackless Robotic Courier: A Perspective on the Development of a Commercial Autonomous Mobile Robot," Lecture Notes in Control and Information Sciences, 1998. vol. 236, p. 182-210.

Thrun et al. "Robust Monte Carlo Localization for Mobile Robots," Artificial Intelligence, Apr. 20, 2000. vol. 128, No. 1-2, p. 99-141.

Wolf et al. "Robust Vision Based Localization by Combining and Image Retrieval System with Monte Carlo Localization," IEEE Transactions on Robotics, Apr. 2005. vol. 21, No. 2, p. 208-216.

Weiss et al. "Keeping Track of Position and Orientation of Moving Indoor Systems by Correlation of Range-Finder Scans," Proceedings of the IEEE/RSJ/GI International Conference on Intelligent Robots and Systems, 1994. vol. 1, p. 595-601.

Thrun et al. "Learning Maps for Indoor Mobile Robot Navigation," School of Computer Science, Apr. 14, 1996.

Thrun et al. "A Probabilistic Approach to Concurrent Mapping and Localization for Mobile Robots," Machine Learning and Autonomous Robots, 31/5 ed., Kluwer Academic Publishers, Boston, Mar. 14, 1998.

Thrun et al. "A Probabilistic Online Mapping Algorithm for Teams of Mobile Robots," International Journal of Robotics, 2001. vol. 20(5), p. 335-363.

Thrun et al. "Map Learning and High-Speed Navigation in RHINO," Carnegie Mellon University, 1997.

Thrun et al. "An Approach to Learning Mobile Robot Navigation," Robotics and Autonomous Systems, Mar. 1995.

Fox et al. "Active Markov Localization for Mobile Robots," Mar. 19, 1998.

Liu et al. "Using EM to Learn 3D Models with Mobile Robots," Eighteenth International Conference on machine Learning, Jun. 28, 2001.

Gutmann et al. "Incremental Mapping of large Cyclic Environments," Proceedings of the IEEE International Symposium on Computational Intelligence in Robotic and Automation, 2000.

* cited by examiner

```
Laser_1 19305 -8479  19294 -8614  19333 -8718  19294 -8868  19317
-9467  19366 -9561  19369 -9678  19389 -9785  19400 -9897  19427
-10001  19416 -10121  19423 -10232  19438 -10339  19452 -10446
19501 -10537  19272 -10742  19217 -10873  19235 -10973  19261 -11070
 19353 -11143  19566 -11173  19590 -11272  19624 -11368  20378
-11227  20421 -11327  18800 -12041  18807 -12136  18881 -12212
19214 -12218  19153 -12628  19106 -12736  18873 -12883  18901 -12971
 18969 -13051  19831 -12982  20155 -13025  20567 -13059  20555
-13168  20591 -13270  20587 -13378  20602 -13483  20605 -13589
20618 -13694  20620 -13800  20611 -13907  20641 -14011  20651 -14116
 20659 -14222  23475 -14404  23471 -14535  23545 -14663  20951
-14958  20792 -15066  20742 -15173  20731 -15279  20749 -15385
20846 -15495  20773 -15599  20199 -15678  20083 -15773  20077 -15874
 20090 -15976  20122 -16079  20133 -16182  20362 -16307  20858
-16465  20836 -16571  20853 -16682  20868 -16793  20883 -16905
20887 -17015  20899 -17127  20911 -17240  14161 -16129  14339 -16213
 20929 -17578  20937 -17692  20953 -17808  20949 -17920  20963
-18038  20976 -18155  20968 -18268  20650 -18300  20303 -18318
20005 -18344  13647 -16646  13547 -16663  13362 -16652  13330 -16687
 13325 -16732  13283 -16763  13202 -16781  13206 -16828  13219
-16879  13213 -16923  13206 -16967  13227 -17023  13247 -17079
13258 -17131  13258 -17180  13240 -17221  13258 -17279  13266 -17332
 13237 -17369  11666 -16644  11626 -16657  11577 -16666  11528
-16673  9576 -15657  9563 -15661  11434 -16721  11419 -16745  11336
-16730  11279 -16728  11256 -16747  9773 -15875  9674 -15826  9626
-15808  11141 -16835  9812 -15962  9763 -15944  9560 -15816  9505
-15789  9491 -15792  9525 -15829  9535 -15850  9663 -15962  9687
-15997  9711 -16031  9679 -16022  9387 -15795  9473 -15880  9542
-15953  9519 -15948  9527 -15970  9527 -15985  9527 -16000  9533
-16022  9533 -16037  9539 -16059  9538 -16075  9543 -16098  9542
-16113  9547 -16136  9552 -16159  9549 -16175  9554 -16198  9557
-16222  9554 -16238  9558 -16261  9560 -16285  9569 -16317  9565
-16333  9567 -16358  9569 -16382  9570 -16406  9577 -16439  9583
-16472  9583 -16497  9588 -16530  9588 -16555  9586 -16580  9590
-16614  9594 -16647  9663 -16782  10497 -18112  10466 -18120  10429
-18119  10392 -18118  10361 -18126  10330 -18132  10293 -18130
10257 -18128  10231 -18142  10195 -18139  10159 -18135  10128 -18140
 10097 -18145  10066 -18149  10031 -18144  10000 -18147  9970 -18151
 9943 -18163  9909 -18156  9882 -18168  9848 -18161  9817 -18163
9787 -18164  9757 -18165  9730 -18175  9696 -18167  9670 -18176
9640 -18176  9613 -18186  9583 -18185  9553 -18184  9526 -18193
9494 -18182  9470 -18199  9440 -18197  9413 -18205  9381 -18193
9354 -18200  9237 -17837  9078 -17269  9024 -17117  9047 -17306
9099 -17653  9188 -17217  9159 -18212  9134 -18227  9105 -18222
9078 -18226  9048 -18211  9022 -18225  8995 -18229  8968 -18232
8939 -18226  8912 -18229  8885 -18232  8858 -18234  8831 -18247
8804 -18249  8777 -18251  8749 -18252  8722 -18254  8695 -18255
8667 -18256  8640 -18247  8612 -18247  8585 -18267  8558 -18257
8530 -18267  8503 -18267  8475 -18266  8447 -18275  8420 -18274
8392 -18272  8364 -18280  8336 -18288  8309 -18276  8280 -18284
8252 -18291  8224 -18288  8196 -18285  8166 -18302  8139 -18298
```

FIG. 6

```
2D-Map
MapInfo: DockType "Name=Dock" "Label=Dock" "NameRequired=1"
MapInfo: GoalType "Name=Goal" "Label=Goal" "NameRequired=1" "Color0=0xffff00" "Heading=Required"
MapInfo: SectorType "Name=ResistedSector" "Label=ResistedSector" "Desc=Area that the robot will try to avoid, but will
drive through if necessary." "NameRequired=1" "Color0=0xf2ea72" "Color1=0xbea4ce" "NameRequired=1"
MapInfo: SectorType "Name=TwoWayDriveOnRightSector" "Label=PreferredDirectionRight" "Desc=Two Way Drive on Right"
"NameRequired=1" "Color0=0xad3b4" "Color1=0x91b899" "Shape=GradTwoWayDriveOnRight" "NameRequired=1"
Cairn: ResistedSector 0 0 0.000000 "" ICON "ResistedSector17" -22940 -14446 -14715 -12764
Cairn: ResistedSector 0 0 0.000000 "" ICON "ResistedSector14" -22794 -12582 -7732 -10205
Cairn: GoalWithHeading -20215 -8485 -87.900000 "" ICON "Mechanical"
Cairn: ResistedSector 0 0 0.000000 "" ICON "ResistedSector18" -18240 -10369 -14050 -9911
Cairn: Goal -13843 -3056 0.000000 "" ICON "Software"
Cairn: ResistedSector 0 0 0.000000 "" ICON "ResistedSector15" -12453 -10401 -9278 -9816
Cairn: ResistedSector 0 0 90.000000 "" ICON "ResistedSector13" -7924 15631 -6354 16802
Cairn: Goal -7126 -16086 0.000000 "" ICON "Empty Conference"
Cairn: Goal -5823 -7570 0.000000 "" ICON "RD_Lab_West_Mid"
Cairn: GoalWithHeading -5693 -1653 135.145272 "" ICON "RD_Lab_West_North"
Cairn: GoalWithHeading -3908 -28384 -179.800000 "" ICON "Offices"
Cairn: ResistedSector 0 0 0.000000 "" ICON "ResistedSector12" -1804 -10937 1082 -7773
Cairn: TwoWayDriveOnRightSector 0 0 0.000000 "" ID=13346 "PreferredDirectionRight" 2271 -18108 14449 -13021
Cairn: ResistedSector 0 0 0.000000 "" ICON "ResistedSector16" 3896 -27097 6854 -25557
Cairn: GoalWithHeading 4195 -28833 -80.258274 "" ICON "Hall Entry"
Cairn: GoalWithHeading 5868 -10253 -90.000000 "" ICON "RD_Mid"
Cairn: GoalWithHeading 17212 -1515 -90.000000 "" ID=3145776 "RD Northeast"
Cairn: Goal 18401 -17381 0.000000 "" ICON "Closet"
Cairn: Goal 19220 -25601 -154.771535 "" ICON "Training"
Cairn: Goal 21597 -7451 0.000000 "" ICON "RD_comm_support"
LINES
-24162 -21563 -6227
-24148 -2057 -24162 -6218
-24141 168 -24148 -2057
-24096 -10015 -24097 -13789
-24096 -1842 -24096 -1843
```

FIG. 10

POSITIVE AND NEGATIVE OBSTACLE AVOIDANCE SYSTEM AND METHOD FOR A MOBILE ROBOT

CROSS-REFERENCE TO RELATED APPLICATIONS

This Application is the U.S. National Stage entry of International Application No. PCT/US2013/023154, filed on Jan. 25, 2013 and which claimed priority to U.S. Provisional Application No. 61/590,806 filed on Jan. 25, 2012 and U.S. Provisional Application No. 61/596,685 filed on Feb. 8, 2012. The entire contents of International Application No. PCT/US2013/023154 and U.S. Provisional Application Nos. 61/590,806 and 61/596,685 are incorporated herein by reference.

FIELD OF ART

This invention generally relates to mobile robots. More specifically, the invention is directed to systems and methods for detecting positive and negative obstacles in physical environments through which mobile robots move and preventing the mobile robots from driving into those obstacles.

BACKGROUND ART

Mobile robots, including autonomously-navigating mobile robots, inertially-guided robots, remote-controlled mobile robots, and robots guided by laser targeting, vision systems, roadmaps and beacons, to name a few examples, normally use horizontally-oriented laser sensors to scan the area in the mobile robot's direction of travel and to detect potential obstacles in the mobile robot's path. The horizontally-oriented lasers, which typically scan in two-dimensional planes roughly parallel with floor, work reasonably well for detecting objects that extend from the floor in a substantially perpendicular direction, so long as the obstacle intersects the horizontally-oriented scanning plane. However, they do not work well for detecting positive physical obstacles in the mobile robot's path that are parallel to the floor and/or obstacles that are not at the same height as the horizontally-oriented scanning plane. This means the mobile robots frequently have no way of detecting and avoiding positive obstacles, such as long tables with legs at the ends (and no legs in the middle), objects suspended from a ceiling or other structure, and obstacles that stick out from the edge of another object, like a keyboard tray. Mobile robots that use horizontally-oriented lasers for detecting obstacles also have problems detecting and avoiding unexpected negative obstacles, such as a hole in the floor, a descending flight of stairs, the end of a loading dock or the edge of a cliff.

Previous attempts to solve these problems have included, for example, attaching a plurality of vertically-oriented or randomly-oriented lasers to the mobile robots and using the vertical or randomly-oriented lasers to detect obstacles parallel to the floor, as well as holes or drop-offs in the floor. However, there have been a number of significant disadvantages associated with such solutions, including prohibitively-high cost associated with installing, using and maintaining a multiplicity of expensive lasers, and an unacceptably high number of false positives arising, for example, from gratings in the floor, which do not necessarily need to be avoided by the mobile robot.

SUMMARY OF THE INVENTION

Embodiments of the present invention provide methods and systems for ensuring that mobile robots are able to detect and avoid positive obstacles in a physical environment that are typically hard to detect because the obstacles do not extend vertically from the floor. Embodiments of the present invention also help to ensure that mobile robots are able to detect and avoid driving into negative obstacles, such as gaps or holes in the floor, or a flight of stairs. In general, embodiments of the present invention include a positive obstacle avoidance system for use with mobile robots, a negative obstacle avoidance system for use with mobile robots, or both a positive and negative obstacle avoidance system operating in the same mobile robot. The inventive systems and methods work for a variety of different types of mobile robots (also known as "automated guided vehicles" or "AGVs"), including without limitation autonomously-navigating mobile robots, visually-guided robots, telepresence robots, haptic input-guided robots and laser- or beacon-following robots.

In one aspect of the invention, there is provided a positive obstacle avoidance system for use with a mobile robot in a physical environment, comprising a first laser attached to the mobile robot, a memory, a laser controller, a positive obstacle avoidance engine and a propulsion system. The first laser attached to the mobile robot is oriented to scan the physical environment in a first plane that is not parallel to the floor of the physical environment. The memory stores initial operating parameters and preferences for the positive obstacle avoidance engine, including: (1) a map defining a floor plan representing the physical environment and a two dimensional coordinate system delineating the floor plan, (2) a first data structure of two-dimensional coordinates from the floor plan, each two dimensional coordinate in the first data structure representing a location in the physical environment to be avoided by the mobile robot, (3) first laser placement information for the first laser, including the first laser's position on the mobile robot and the first laser's orientation (or tilt angle), and (4) a tolerance profile for the obstacle avoidance system. The tolerance profile typically includes a ceiling offset, a floor offset, a ceiling adjustment angle and a floor adjustment angle. Using a tolerance profile in the positive obstacle avoidance engine calculations reduces the number of false positives that might otherwise result if, for example, the floor or the ceiling is not exactly horizontal, or if the laser is not installed at exactly the right height or orientation relative to the floor, the ceiling or the direction of travel. The initial operating parameters may be received from a remote system via a wired or wireless communication interface on the mobile robot, stored in a database onboard the mobile robot, or hard-coded into the program instructions comprising the positive obstacle avoidance engine. The data structure used to store the two-dimensional coordinates representing locations in the physical environment that the mobile robot should avoid may comprise any suitable data structure for organizing and managing two-dimensional coordinate data, as would be known by those skilled in the computer arts, including without limitation, a collection of database records, a linked list, a table, an array, a tree, a heap, or a stack. In some embodiments and applications, the data structure of two-dimensional coordinates describes what is known in the art as an "occupancy grid" for the floor plan for the physical environment.

The laser controller receives a set of laser readings from the first laser, each laser reading corresponding to a location in the physical environment where the first laser detects a physical obstacle that may or may not need to be avoided by the mobile robot, depending, for example, on whether the object at the location is truly a physical object existing in the path of the mobile robot, or merely a spot on a distant part of the floor or the ceiling of the physical environment. Typically, the laser provides laser readings in polar coordinates (angle and distance to the detected obstacle), but other types of laser readings may be suitably used without departing from the scope of the invention. Thus, the laser readings received by the laser controller include a first plane angle (theta) and a first plane distance (radius=r) from a given site on the mobile robot.

For each reading in the set of laser readings received from the first laser, the positive obstacle avoidance engine, typically comprising computer software instructions executable on a microprocessor on board the mobile robot, determines whether the reading represents a spot on the floor or the ceiling of the physical environment, or otherwise represents an object existing between the floor and the ceiling that should be avoided by the mobile robot. If the reading identifies an obstacle, rather than a spot on the ceiling or the floor, the positive obstacle avoidance engine stores the x and y coordinates of the laser reading in the first data structure in order to "remember" that location, in accordance with the floor plan, as a location to be avoided. The positive obstacle avoidance engine accomplishes this by first converting the laser reading (theta and r) into a three-dimensional coordinate based on the first plane angle (theta), the first plane distance (r), the first laser position and said first laser tilt in the memory. The three-dimensional coordinate includes an x-component, a y-component and a z-component. Because the first laser may be attached to the mobile robot in a variety of different orientations, so long as its scanning plane is not horizontal (i.e., not parallel to the floor), the formula used to calculate the three-dimensional coordinate depends on the angle of the scanning plane relative to the floor and the direction of travel for the mobile robot. So, for example, when the first laser's scanning plane is perpendicular to the floor and parallel to the direction of the mobile robot's direction of travel, the positive obstacle avoidance engine may be programmed to convert the laser readings into a three-dimensional coordinate (x, y, z) using the formulas:

x-component=first laser x position+first plane distance*cosine(first plane angle), y-component=first laser y position, and z-component=first laser z position+first plane distance*sin(first plane angle).

Next, the positive obstacle avoidance engine determines a minimum ceiling height and a maximum floor height for the three-dimensional coordinate based on the x-component, the y-component and the tolerance profile. The maximum floor height may be calculated, for example, by using the formula:

maximum floor height=floor offset+A*sin(floor adjustment angle), wherein, A=the distance from the current position to the coordinate (x-component, y-component) in the two-dimensional coordinate system. The minimum ceiling height may be calculated according to the formula:

minimum ceiling height=ceiling offset+A*sin(ceiling adjustment angle), wherein, A=the distance from the current position to the coordinate (x-component, y-component) in the two-dimensional coordinate system.

If the z-component is between the minimum ceiling height and the maximum floor height, then the positive obstacle avoidance engine is considered to have detected a positive obstacle suspended above the floor and below the ceiling. This obstacle could be the horizontal part of a table, a keyboard tray sticking out of a desk or workstation, or some other cantilevered object. In this case, the positive obstacle avoidance engine will add the x-component and the y-component of the three-dimensional coordinate (representing the two-dimensional locations on the floor plan beneath the table, keyboard tray or other object) to the first data structure of two-dimensional coordinates to represent a new location in the physical environment to be avoided by the mobile robot. In this fashion, the positive obstacle avoidance engine builds a data structure of two-dimensional coordinates (or adds new two-dimensional coordinates to a previously-existing data structure) that identifies all of the locations on the floor plan where a positive obstacle has been found.

The propulsion system typically comprises a collection of hardware and software components that cause the mobile robot to drive about the physical environment under control of the first data structure. This means the propulsion system prevents the mobile robot from passing into the locations in the physical environment represented by the two-dimensional coordinates in the first data structure by plotting a path around the locations, if possible, or bringing the mobile robot to a stop if no path around the obstacle is available. In some embodiments, the mobile robot receives a command from another computer system to move the mobile robot from its current position to a specified location in the physical environment. In such cases, the mobile robot may include a wired or wireless communication interface to enable receiving such commands, and the propulsion system may encompass a path planning engine that calculates, in accordance with the floor plan, a path between the current position and the specified location, wherein the path is calculated so as to avoid the locations in the physical environment represented by the first data structure of two-dimensional coordinates. Then the propulsion system, which may include navigation and locomotion components (e.g., motors and wheels and a microcontroller to operate the motors and wheels) automatically drives the mobile robot along the calculated path, thereby avoiding the obstacle.

Multiple non-horizontal lasers oriented to scan the physical environment in non-horizontal planes may be used to enhance the mobile robot's ability to detect and avoid positive obstacles that do not extend vertically from the floor or intersect the mobile robot's horizontal scanning planes, and are therefore undetected by the mobile robot's horizontal lasers. Thus, in addition to the first non-horizontal laser scanning in the first plane, a second non-horizontal laser may be attached to the mobile robot and oriented to scan the physical environment in a second plane that is also not parallel to the floor of the physical environment. In such embodiments, the memory stores a second set of initial operating parameters and preferences for use by the positive obstacle avoidance engine in processing the laser readings from the second non-horizontal laser, including: (1) a second data structure of two-dimensional coordinates from the floor plan, each two dimensional coordinate in the second data structure representing another location in the physical environment to be avoided by the mobile robot, and (2) placement information for the second laser, including a second laser position and a second laser tilt. In this case, the laser controller receives a second set of laser readings from the second laser, each laser reading corresponding to a location in the physical environment where the second laser detects a physical obstacle in the second plane. The positive obstacle avoidance engine performs the same calculations for each laser reading received from the second set of laser readings in order to determine whether the detected obstacle represents the expected floor or ceiling, based on distance and angle from the robot, or otherwise represents some obstacle located between the floor and the ceiling in the physical environment that needs to be avoided.

Thus, the positive obstacle avoidance engine converts each laser reading into a second three-dimensional coordinate based on the second plane angle (theta), the second plane distance (r), the second laser position and the second laser tilt. The positive obstacle avoidance engine then determines an minimum allowable ceiling height and a maximum allowable floor height for the second three-dimensional coordinate based on the x-component of the second three-dimensional coordinate, the y-component of the second three-dimensional coordinate and the tolerance profile. Then the engine determines whether the second z-component lies between the allowable floor height and the allowable ceiling height based on the z-component's distance from the robot. If so, the positive obstacle avoidance engine adds the x-component and the y-component of the second three-dimensional coordinate to the second data structure of two-dimensional coordinates to represent another location in the physical environment to be avoided by the mobile robot. In this manner, the positive obstacle avoidance engine builds and populates a second collection or list of two-dimensional coordinates from the floor plan that the mobile robot should avoid while driving about the physical environment. The propulsion system drives the mobile robot about the physical environment under control or influence of the first data structure and the second data structure, while preventing the mobile robot from passing into the locations in the physical environment represented by the two-dimensional coordinates in both the first data structure and the second data structure. It will be understood by those skilled in the art that embodiments of the present invention may in fact store all of the two-dimensional coordinates for both the first laser and the second laser in a single data structure, or a multiplicity of different data structures, instead of two discreet data structures, without departing from the scope of the claimed invention. Any number of data structures may be used, so long as the propulsion system accesses the stored two-dimensional coordinate data to determine which parts of the floor plan should not be driven into by the mobile robot.

In another aspect, embodiments of the present invention also provide a negative obstacle avoidance system for use with a mobile robot in a physical environment. The negative obstacle avoidance system operates to prevent the mobile robot from driving into a hole or ditch, driving off the edge of a cliff, or driving across an unacceptably large gap in the floor. In essence, the negative obstacle avoidance system does this by comparing currently-received floor distance readings from one or more non-horizontally-oriented lasers with a tolerance profile, which defines, among other things, the largest gap in the floor (i.e., a "gap profile") that the mobile robot will be permitted to traverse. Embodiments of the present invention, however, also use the tolerance profile settings to avoid recognizing too many false positives in the data, which could arise, for example, when the mobile robot is approaching a relatively safe grating, small bump or small gap in the floor. The tolerance profile settings also reduce the number of false positives that arise when the laser data readings are less than perfect. This might occur, for example, when the laser light coming from the mobile robot strikes something too reflective and at an angle that prevents the light from returning to the sensor, or when the laser light coming from the mobile robot strikes something that is not reflective enough, and therefore absorbs too much of the light for any of it to return to the mobile robot.

In general, the negative obstacle avoidance system comprises a first laser attached to the mobile robot, a memory, a laser controller, a negative obstacle avoidance engine and a propulsion system. The first laser is oriented to scan the physical environment in a first plane that is not parallel to the floor of the physical environment. The memory stores a set of initial operating parameters and preferences for use by the negative obstacle avoidance engine, including: (1) a map defining a floor plan representing the physical environment and a two dimensional coordinate system delineating the floor plan, (2) a first data structure of two-dimensional coordinates from the floor plan, each two dimensional coordinate in the first data structure representing locations in the physical environment to be avoided by the mobile robot, (3) first laser placement information for the first laser, including a first laser position and a first laser tilt, and (4) a tolerance profile comprising a maximum floor offset, a minimum floor offset, a maximum floor adjustment angle, a minimum floor adjustment angle and a maximum allowable floor gap.

The laser controller receives a set of laser readings from said first laser, each laser reading corresponding to a location in the physical environment within said first plane, and each laser reading comprising a first plane angle and a first plane distance from a given site on the mobile robot. The negative obstacle avoidance engine first converts each laser reading into a three-dimensional coordinate based on the first plane angle, the first plane distance, the first laser position and the first laser tilt. Next, the negative obstacle avoidance engine determines a maximum allowable floor height and a minimum allowable floor height for the three-dimensional coordinate based on the x-component, the y-component and the tolerance profile. The engine then determines if the z-component falls between the maximum allowable floor height and the minimum allowable floor height. If it does, the negative obstacle avoidance system changes an indicator, such as a flag in the memory to designate the x-component and the y-component of the three-dimensional coordinate as the coordinate corresponding to the last good floor reading. If the z-component does not fall between the maximum allowable floor height and the minimum allowable floor height, then the negative obstacle avoidance engine determines whether the distance G between the last good floor reading coordinate and the location in the two-dimensional coordinate system defined by the x-component and the y-component exceeds the maximum allowable floor gap stored in the memory. If the distance G exceeds the maximum allowable floor gap, the negative obstacle avoidance engine adds the x-component, the y-component and the last good floor reading coordinates to the first data structure of two-dimensional coordinates to represent another location in the physical environment to be avoided by the mobile robot. The propulsion system then drives the mobile robot in the physical environment under control of the first data structure, so as to prevent the mobile robot from passing into the locations in the physical environment represented by the two-dimensional coordinates in the first data structure. Thus, the mobile robot, operating under the control of the propulsion system, which itself operates under the influence of the first data structure of two-dimensional coordinates identifying all of the two-dimensional coordinates in the floor plan to be avoided, avoids driving into the gap, ditch or hole, or off of a cliff.

In yet another aspect there is provided a method for avoiding positive obstacles in a mobile robot comprising a memory and a propulsion system. The first step in the method comprises storing the map, the first data structure of two-dimensional coordinates, the first laser placement information and the tolerance profile in the memory. In the next step, a set of laser readings from the first laser are received, each laser reading corresponding to a location in the physical environment where said first laser detects a physical obstacle in the first plane, and each laser reading having a first plane angle (theta) and a first plane distance (radius=r) from a given spot on the mobile robot. Next, each laser reading in the set of laser readings is automatically processed by the mobile robot by: (1) converting each laser reading into a three-dimensional coordinate based on the first plane angle (theta), said first plane distance (r), the first laser position and the first laser tilt. The three-dimensional coordinate includes an x-component, a y-component and a z-component. Then, a minimum ceiling height and a maximum floor height for the three-dimensional coordinates are determined based on the x-component, the y-component and the tolerance profile. If the z-component falls between the minimum ceiling height and the maximum floor height, then the laser reading is considered to have detected an obstacle that (such as a table surface or overhang) that should be avoided, and the x-component and the y-component of the three-dimensional coordinate (which point to the spot on the floor below the table or overhang) are added to the first data structure of two-dimensional coordinates to represent a new location in the physical environment to be avoided by the mobile robot. In the final step, the propulsion system drives the mobile robot in the physical environment under the influence or control of the first data structure. As previously stated, this means the propulsion system periodically checks the data in the first data structure of two-dimensional coordinates and prevents the mobile robot from passing into the locations in the physical environment represented by the two-dimensional coordinates in the first data structure. By avoiding the spots on the floor below the table or overhang, the mobile robot also avoids driving into the table or overhang. In some embodiments, the mobile robot does its own path planning and navigation. In these embodiments, the method further includes the steps of: (1) receiving on the mobile robot a command to move from a current position to a specified location in the physical environment, (2) calculating on the mobile robot, in accordance with the floor plan, a path between the mobile robot's current position and the specified location that avoids the locations in the physical environment represented by the coordinates in the first data structure of two-dimensional coordinates, and (3) activating the propulsion system to automatically drive the mobile robot along the path.

In still another aspect, the present invention provides a method for avoiding negative obstacles in a physical environment using a mobile robot comprising a memory and a propulsion system. In this aspect, the method begins by storing in the memory a map defining the floor plan representing the physical environment and a two dimensional coordinate system delineating the floor plan, a first data structure of two-dimensional coordinates from the floor plan, the two dimensional coordinates in the first data structure representing locations in the physical environment to be avoided by the mobile robot, first laser placement information for a first laser attached to the mobile robot, the first laser being oriented to scan the physical environment in a first plane that is not parallel to the floor of the physical environment. The first laser placement information includes a first laser position and a first laser tilt, and a tolerance profile comprising a maximum floor offset, a minimum floor offset, a maximum floor adjustment angle, a minimum floor adjustment angle and a maximum allowable floor gap. The next step comprises receiving a set of laser readings from the first laser, each laser reading corresponding to a location in the physical environment within the first plane, and each laser reading comprising a first plane angle and a first plane distance from a given site on the mobile robot. Then, each laser reading in the set of laser readings is converted into a three-dimensional coordinate based on the first plane angle (theta), said first plane distance (r), the first laser position and the first laser tilt. The three-dimensional coordinate has an x-component, a y-component and a z-component. In the next step, the mobile robot determines a maximum allowable floor height and a minimum allowable floor height for the three-dimensional coordinate based on the x-component, the y-component and the tolerance profile. If the z-component falls between the maximum allowable floor height and the minimum allowable floor height, the mobile robot changes an indicator, such as flag in the memory to designate the x-component and the y-component of the three-dimensional coordinate as the last good floor reading. However, if the z-component does not fall between the maximum allowable floor height and the minimum allowable floor height, the mobile robot next determines whether the distance G between the last good floor reading and the location in the two-dimensional coordinate system defined by the x-component and the y-component exceeds the maximum allowable floor gap. If it does, then the system has found a gap in the floor that the mobile robot cannot safely traverse, in which case the system adds the x-component, the y-component and the last good floor reading to the first data structure of two-dimensional coordinates to represent a new location in the physical environment to be avoided by the mobile robot. In the final step of the method, the system causes the propulsion system to drive the mobile robot in the physical environment under the influence or control of the first data structure, the propulsion system preventing the mobile robot from passing into the locations in the physical environment represented by the two-dimensional coordinates in the first data structure.

BRIEF DESCRIPTION OF THE DRAWINGS

The present invention and various aspects, features and advantages thereof are explained in more detail below with reference to exemplary and therefore non-limiting embodiments and with the aid of the drawings, which constitute a part of this specification and include depictions of the exemplary embodiments. In these drawings:

FIG. 6 shows, in printed form, an example of the coordinate data in the data structure of two-dimensional coordinates in some embodiments of the present invention.

FIG. 10 illustrates, by way of example, some of the data content of a map file defining a floor plan for the physical environment. The map file is stored in the memory of the mobile robot according to embodiments of the invention.

DETAILED DESCRIPTION OF EXEMPLARY EMBODIMENTS

Figure 1A:
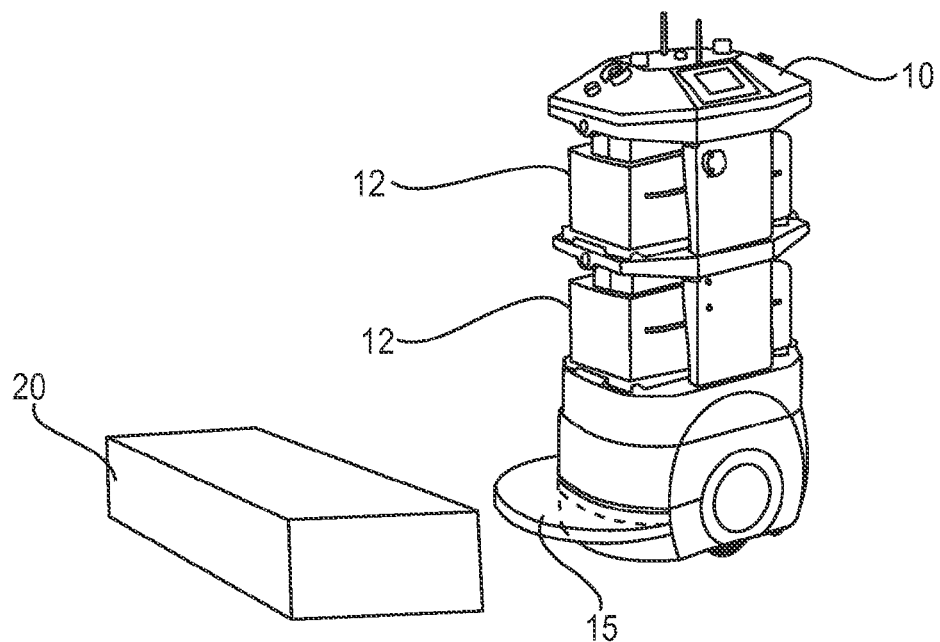
FIGS. 1A and 1B together illustrate, by way of example, one of the disadvantages of conventional laser-based obstacle avoidance systems for mobile robots.
Figure 1B:
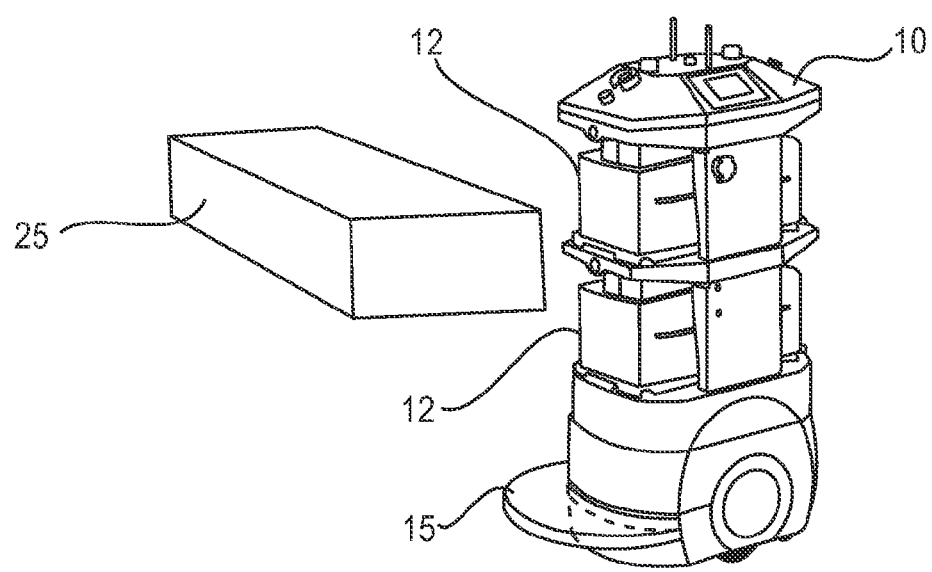

FIGS. 1A and 1B together illustrate, by way of non-limiting example, one of the disadvantages of conventional laser-based obstacle avoidance systems for mobile robots. As shown in FIGS. 1A and 1B, mobile robot 10 is equipped with a horizontally-oriented scanning laser (not shown), which emits laser light rays 15 that fan out in front of the robot in a substantially horizontal plane that is roughly parallel to the floor or other surface upon which the mobile robot travels. When mobile robot 10 approaches an obstacle that is resting on the floor of the physical environment, or very near the floor, such as obstacle 20 in FIG. 1A, the laser light rays 15 strike the obstacle 20 and are reflected back to the mobile robot 10. Sensors in the laser detect and process the reflections, thereby informing the mobile robot 10 that there is an obstacle 20 in its path that needs to be avoided. Thus, the obstacle avoidance and locomotion controllers on board mobile robot 10, if any, cause mobile robot 10 to go around obstacle 20 or otherwise brake to come to a stop before mobile robot 10 can collide with the obstacle 20. This process is sometimes called "laser localization," or "Monte Carlo localization with a laser." However, as shown in FIG. 1B, when mobile robot 10 approaches an obstacle 25 suspended above the floor or travel surface in such a way that obstacle 25 does not lie in the same plane as the laser light rays 15 emanating from the horizontally-oriented laser on mobile robot 10, then the laser light rays 15 will not strike and thus will not be reflected back from obstacle 25. Since mobile robot 10 does not detect light bouncing back at it from the distance corresponding to the location of obstacle 25, it does not "know" that there is an obstacle 25 in its path and, consequently, collides with obstacle 25, potentially causing severe damage to mobile robot 10, obstacle 25, cargo 12, or all of them.

Although it would be possible to detect obstacle 25 by raising the scanning laser to a higher position on mobile robot 10, this solution would only lead to mobile robot 10 not being able to detect and avoid colliding with obstacles closer to the floor, such as obstacle 20 shown in FIG. 1A. Depending on the height of the mobile robot, as well as the physical environment where the mobile robot operates, adding a multiplicity of horizontally-oriented scanning lasers to mobile robot 10 in order to account for every possible obstacle may be impractical due to the expense and the trouble of purchasing, installing and maintaining a large number of lasers for every mobile robot in an organization, as well as managing, crunching and using all of the data that such a multiplicity of installed lasers would produce.

Figure 2:
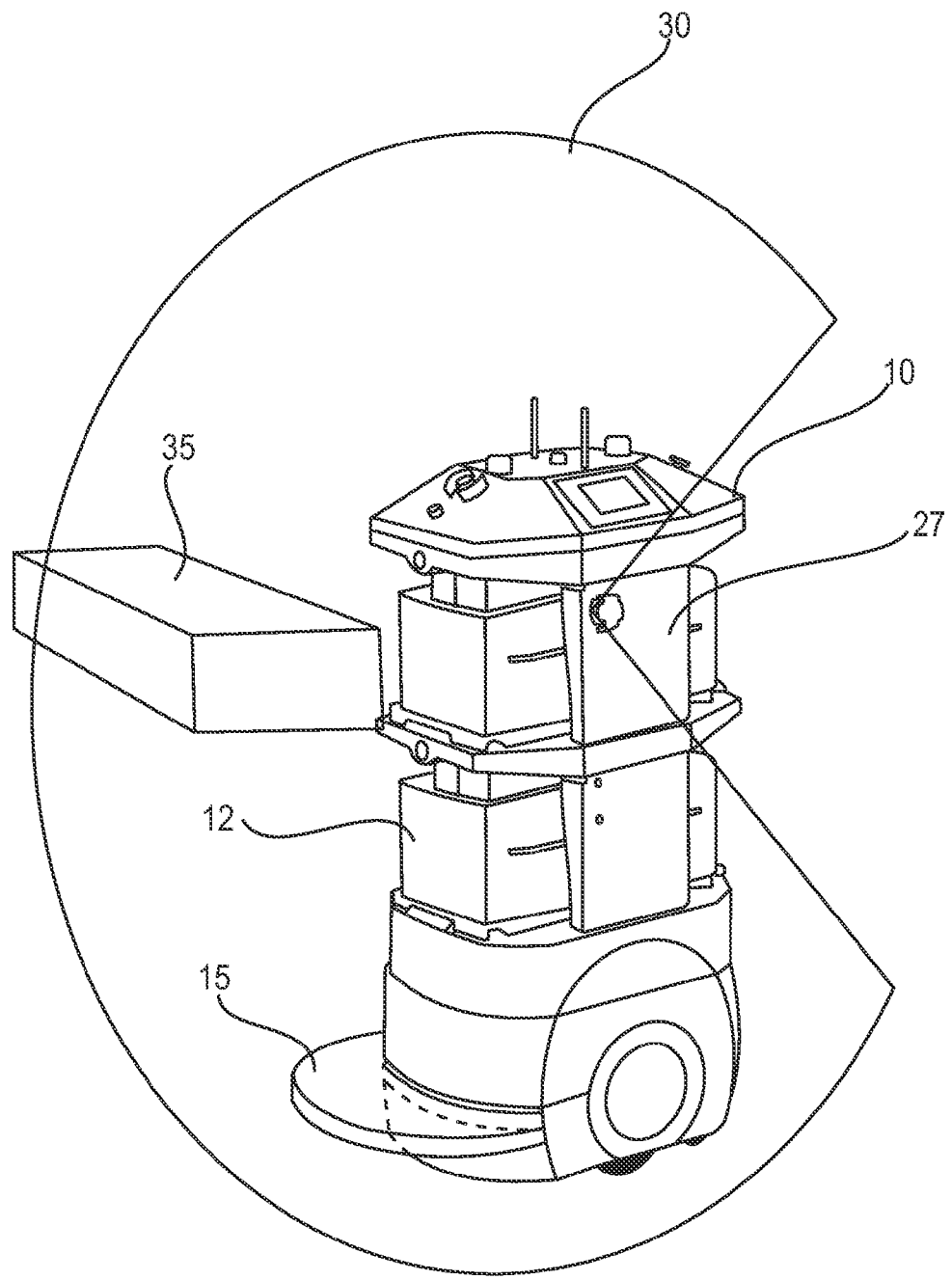
FIG. 2 illustrates, by way of non-limiting example, the placement and orientation of an additional scanning laser in accordance with an exemplary embodiment of the present invention.

FIG. 2 illustrates, by way of non-limiting example, the placement and orientation of an additional scanning laser in accordance with an exemplary embodiment of the present invention. As shown in FIG. 2, scanning laser 27 is attached to mobile robot 10 and oriented so that it emits laser light rays 30 in a plane that is not parallel to the floor of the physical environment. In this orientation, scanning laser 27 emits laser light rays 30 in a plane that is much more likely to intersect with and be reflected from any obstacle, including obstacle 35, in mobile robot 10's path. Thus laser light rays 30 are much more likely to be reflected back to mobile robot 10 when mobile robot 10 approaches tables with legs at the ends, protruding keyboard trays, obstacles suspended from the ceiling or suspended from other objects, and the like. Although the scanning laser 27 may be installed so that the laser light rays 30 emanating from scanning laser 27 fall into a plane that is substantially perpendicular to the floor, scanning the physical environment in a plane that is perpendicular to floor is not required. Orienting the lasers to scan other planes will work just as well or better, depending on the lasers used and the physical environment, so long as the lasers are installed so that they scan in planes that are not parallel to the floor, or more accurately, parallel with the objects that are most likely to form obstacles that the mobile robot needs to avoid, such as tables and keyboard trays.

Figure 3:
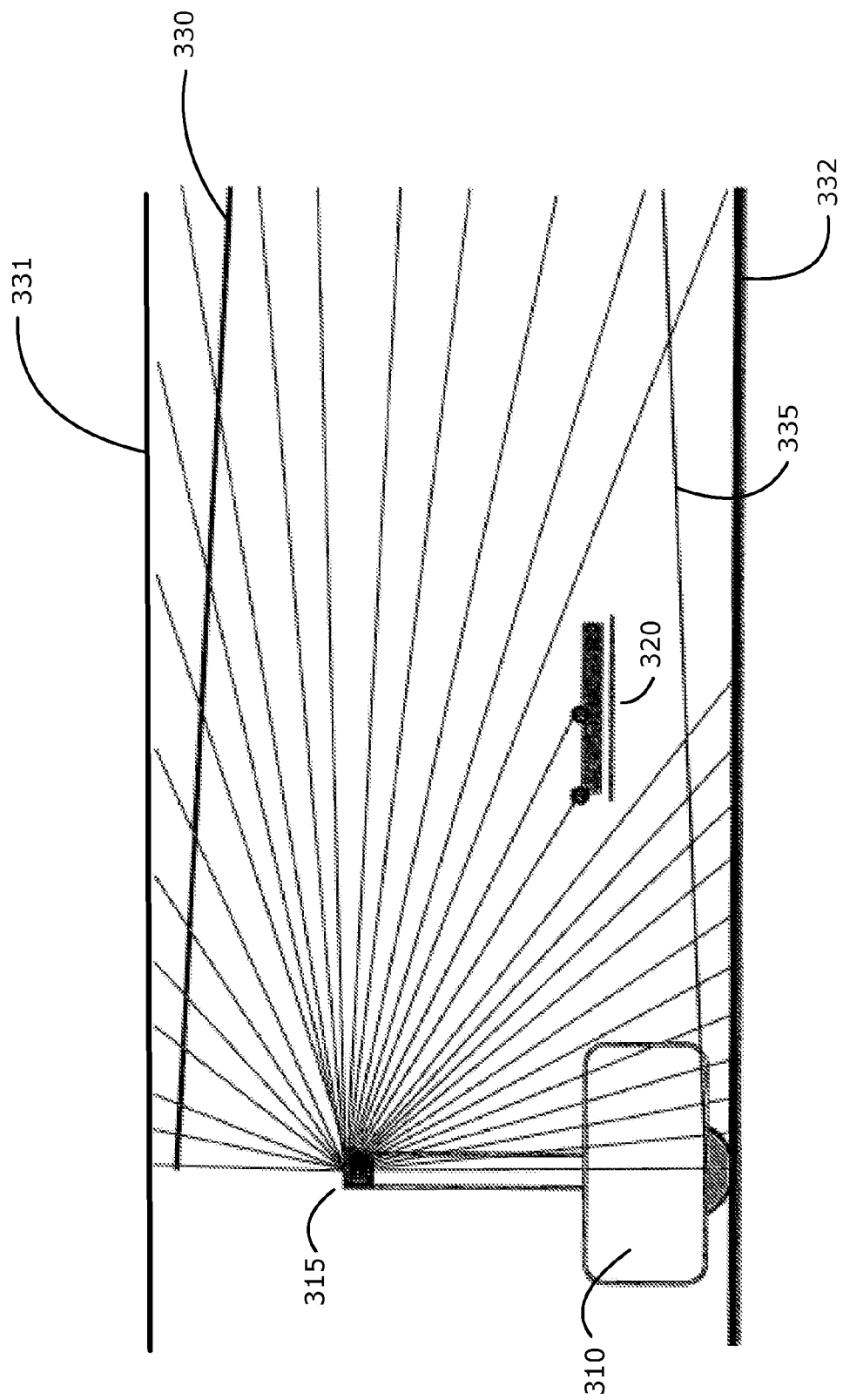
FIG. 3 contains a schematic diagram that illustrates, by way of non-limiting example, how a scanning laser attached to a mobile robot, and oriented to operate in accordance with exemplary embodiments of a positive obstacle avoidance system of the present invention, detects horizontally-oriented objects in the physical environment where the mobile robot operates.

FIG. 3 contains a schematic diagram that illustrates, by way of non-limiting example, how a scanning laser 315 attached to a mobile robot 310, and oriented to operate in accordance with exemplary embodiments of a positive obstacle avoidance system of the present invention, detects horizontally-oriented objects in mobile robot 10's path of travel. As shown in FIG. 3, scanning laser 315 produces laser light rays that intersect with a horizontally-oriented obstacle 320 in mobile robot 310's path of travel. As illustrated by FIG. 3, a multiplicity of laser light rays may strike and be reflected back toward mobile robot 310, depending on the relative heights of scanning laser 315 and obstacle 320. It should be understood that, even if scanning laser 315 and obstacle 320 are at exactly the same height, the non-horizontal orientation of the plane of laser light produced by scanning laser 315 ensures that at least some of the laser light rays will strike the obstacle 320. Thus, while mobile robot 310 may not be capable of "seeing" multiple spots on the top surface of obstacle 320 (as shown in FIG. 3), because the obstacle 320 is at the same height as the scanning laser 315, it will still "see" the nearest edge of the horizontally-oriented obstacle as the mobile robot 310 approaches the obstacle 320, and therefore take steps to avoid it, as will be described in more detail below.

In accordance with embodiments of the present invention, FIG. 3 also illustrates the locations of the minimum allowable ceiling height 330 and maximum allowable floor height 335 calculated and used by the positive obstacle avoidance engine, as described herein. The slope in the minimum allowed ceiling height 330 and the maximum allowable floor height 335, as well as their offsets from the real ceiling 331 and real floor 332, respectively, permits mobile robots operating according to embodiments of the invention to function properly even though the ceiling or the floor, or both of them, may not be exactly horizontal. Thus, the mobile robot 310 will not determine, erroneously, that the floor or the ceiling is an obstacle in its path that must be avoided merely because the floor happens to rise a little, or because the ceiling happens to fall a little, as the distance from the robot increases, so long as the laser readings received by the mobile robot 310 indicate that the object detected is at or below the maximum allowable floor height 335, or at or above the minimum allowable ceiling height 330.

Figure 4:
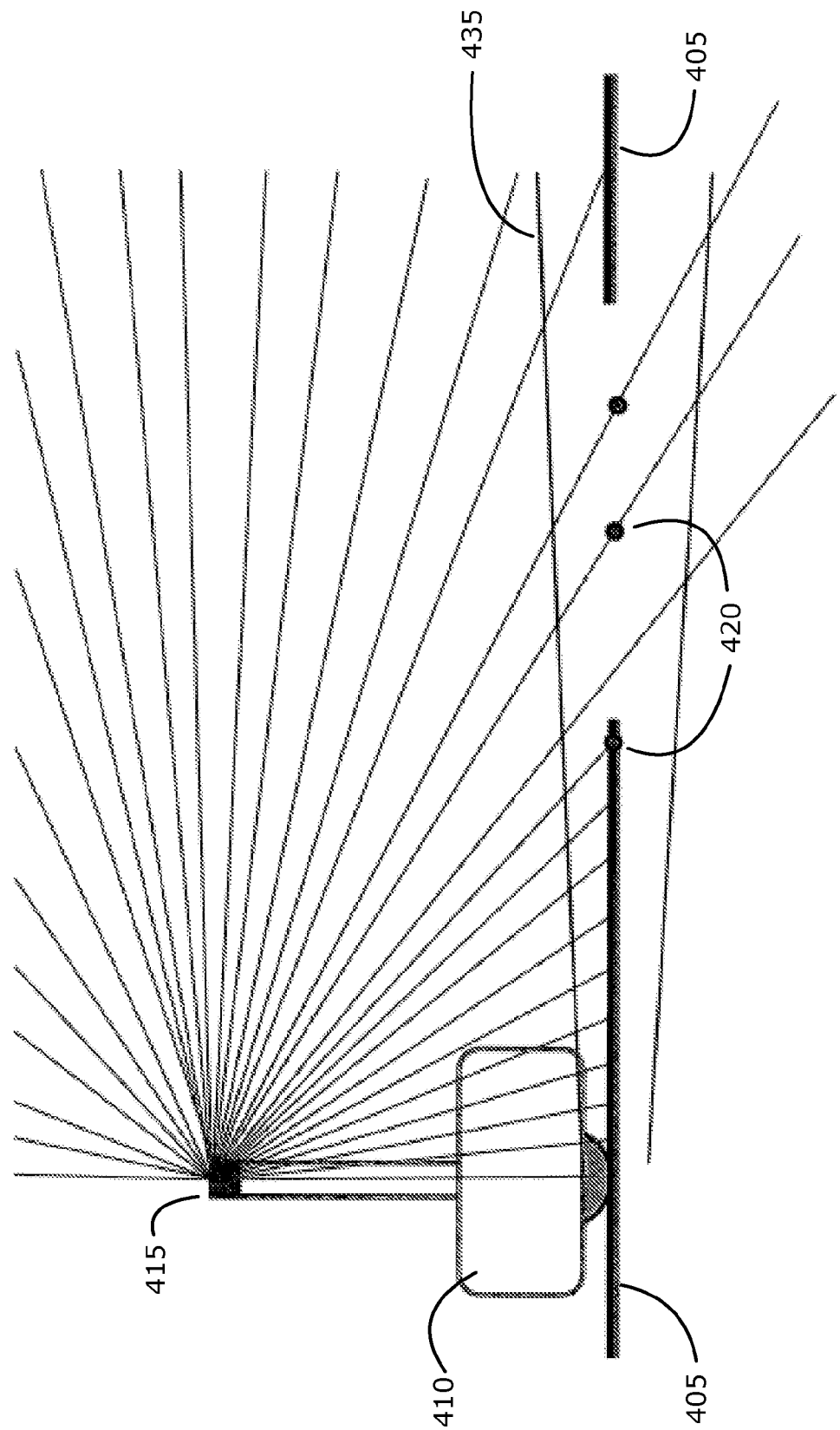
FIG. 4 contains a schematic diagram illustrating, by way of example, how a scanning laser attached to a mobile robot, and oriented to operate in accordance with embodiments of the present invention, detects an unacceptably large gap in the floor of the physical environment.

FIG. 4 contains a schematic diagram illustrating, by way of example, how a scanning laser 415 attached to a mobile robot 410, and oriented to operate in accordance with embodiments of the present invention, detects an unacceptably large gap 420 in the floor 405 of the physical environment. As shown in FIG. 4, scanning laser 415 is attached to mobile robot 410 and oriented to scan the physical environment in a plane that intersects the floor 405. As explained herein, mobile robot 410 has a negative obstacle avoidance engine that is configured to remember the last good floor reading obtained by the engine and constantly compares that last good floor reading with current readings in order to determine if it is safe for the mobile robot 410 to traverse the gap 420. If the gaps are small, for example, such as would be the case when the gap is one of the holes in a screen or grate, then embodiments of the present invention are typically configured to permit the mobile robot to continue driving over the gaps in the screen or grate because such screens or grates will not pose a risk or danger to the mobile robot 410.

Figure 5:
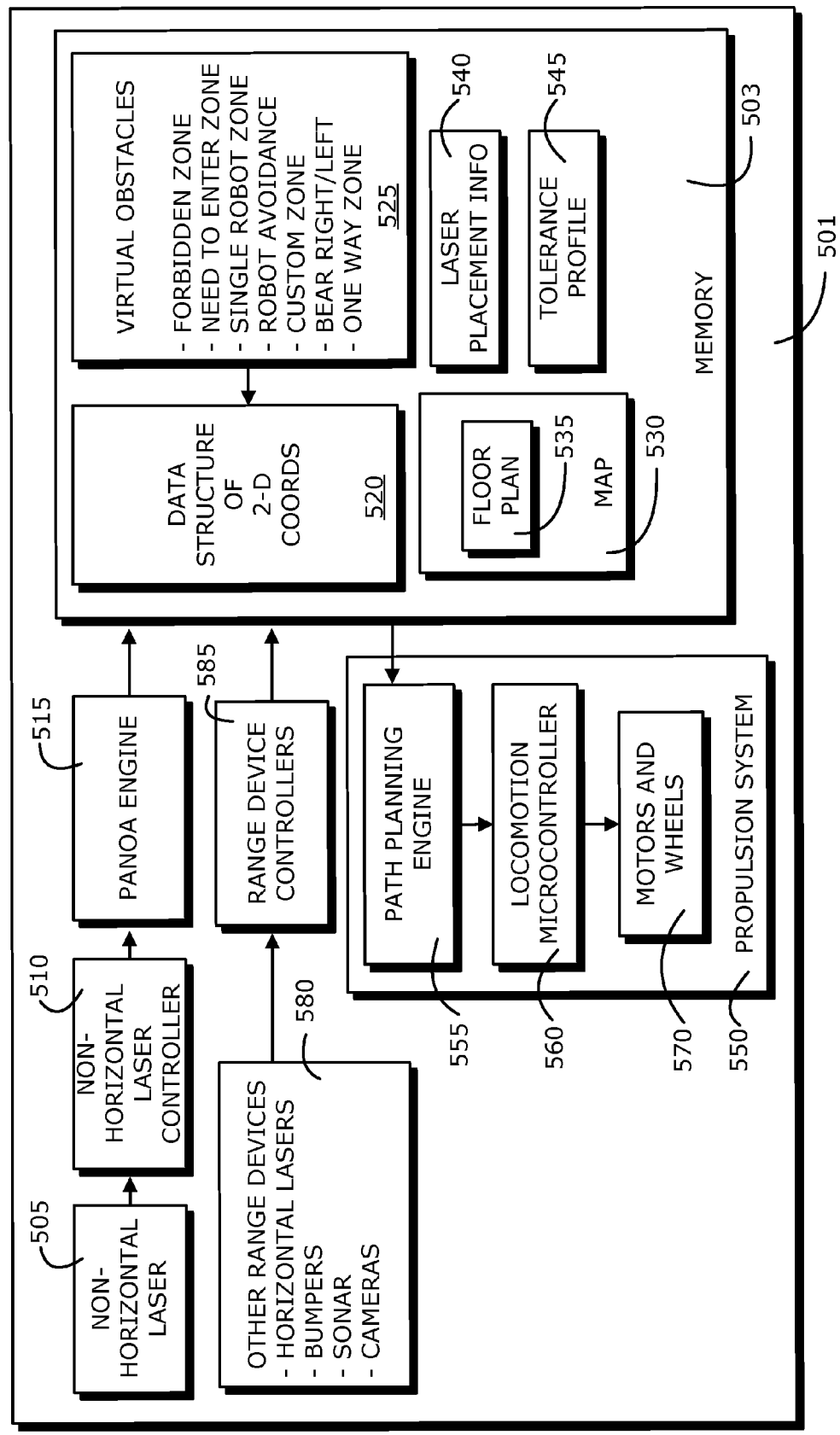
FIG. 5 shows a high-level block diagram illustrating the major physical and logical components of a mobile robot with a positive and negative obstacle avoidance system in accordance with exemplary embodiments of the present invention.

FIG. 5 shows a high-level block diagram illustrating the major physical and logical components of a mobile robot 501 having a positive and negative obstacle avoidance system in accordance with exemplary embodiments of the present invention. As shown in FIG. 5, the mobile robot 501 includes a non-horizontal laser (or "first laser") 505, a non-horizontal laser controller 510, a positive and negative obstacle avoidance engine 515, a memory 503 and a propulsion system 550. The non-horizontal laser 505 on the mobile robot 501 is oriented to scan the physical environment in a first plane (not shown) that is not parallel to the floor of the physical environment. The non-horizontal laser is programmatically coupled to a non-horizontal laser controller 510, that receives the non-horizontal laser's readings are passes that information along to the positive and negative obstacle avoidance engine 515. Suitable lasers and laser controllers to use for these purposes may be obtained, for example, from Hokuyo Urg, of Japan (Part Nos. URG-04LX and URG-04LX-UG01).

Typically, but not necessarily, mobile robots operating according to embodiments of the present invention will also have one or more other range devices 580, including another scanning laser, that the mobile robot 501 uses, for example, to scan in a horizontal plane that is parallel to the floor. The horizontally-oriented laser and other range devices 580 send readings to one or more range device controllers 585, which uses the data to populate the data structure of two-dimensional coordinates 520 with two-dimensional (x,y) coordinates representing locations in the physical environment that the mobile robot 501 should avoid. The other range devices 580 may be very useful, for example, for detecting vertically-oriented objects extending from the floor of the physical environment, which may not be easy to detect with the non-horizontal laser 505, especially if the non-horizontal laser 505 happens to be oriented to scan in a plane that is perpendicular to floor. Notably, although shown as separate controllers in FIG. 5, it will be recognized by those skilled in the art, upon reading this disclosure, that embodiments of the present invention may use a single range device controller to receive readings from both the horizontally-oriented lasers and the non-horizontally-oriented laser.

Figure 11:
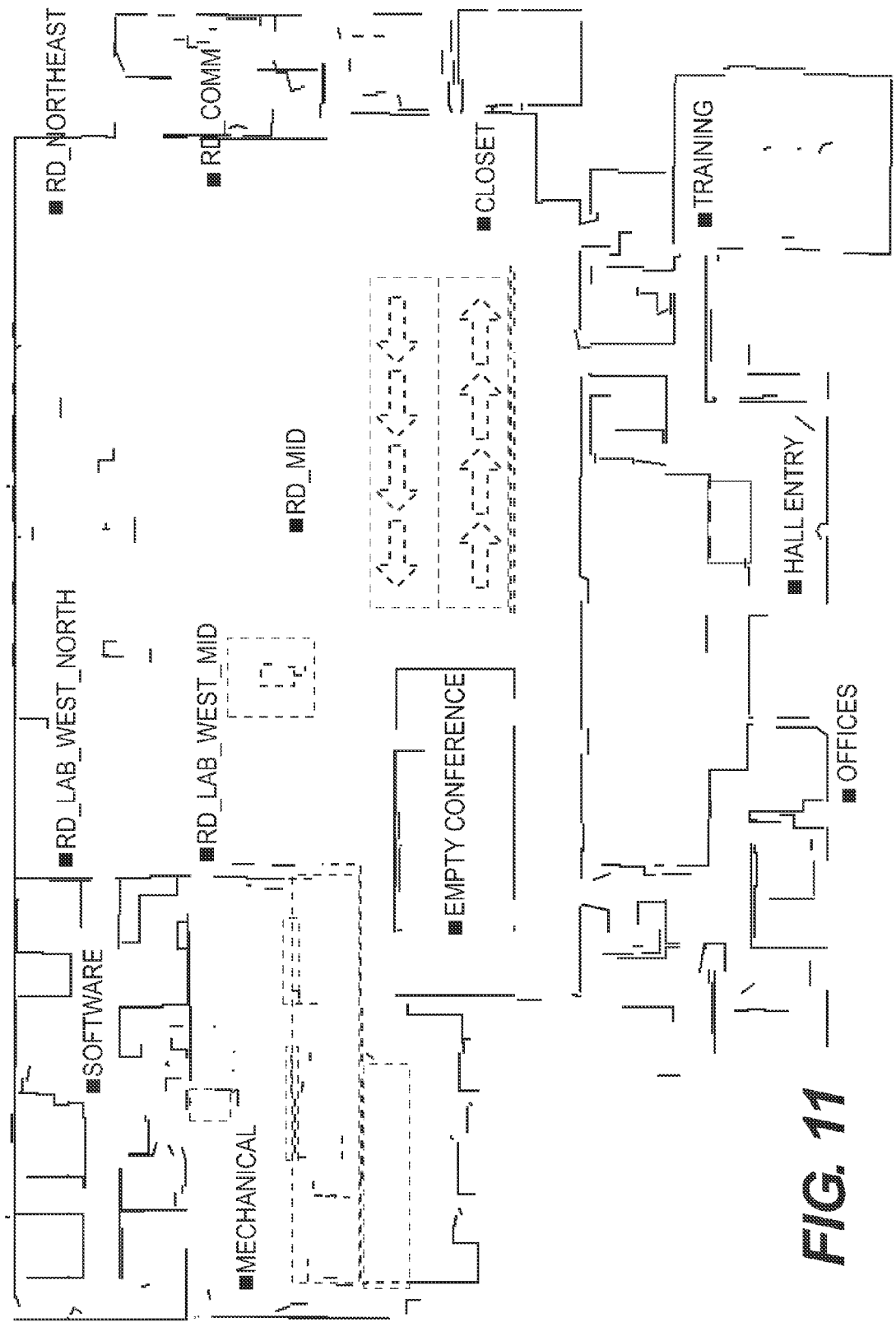
FIG. 11 shows a graphical representation of the map file illustrated in FIG. 10.

The memory 503 stores initial operating parameters and preferences for the positive obstacle avoidance engine 515, including a map 530 defining a floor plan 535 representing the physical environment and a two dimensional coordinate system delineating the floor plan 535. Exemplary data content for a computer file comprising the map 530 is shown in FIG. 10. FIG. 11 shows a graphical representation of the map 530. The initial operating parameters stored in the memory 503 also include a data structure of two dimensional coordinates 520. Each two dimensional coordinate in the data structure 520 represents a location in the physical environment to be avoided by the mobile robot 501 because some obstacle has been detected at that location. In some embodiments, coordinates for virtual obstacles 525, including things like forbidden zones, need to enter zones, single robot zones, robot avoidance zones, one-way zones, and the like, may be defined by the system operator and added to the data structure of two-dimensional coordinates to control where mobile robots can and cannot go in the physical environment, even though no physical obstacles exist in those locations. FIG. 6 shows, in printed form, an example of the coordinate data stored in the data structure of two-dimensional coordinates 520 in some embodiments of the present invention.

Returning to FIG. 5, the memory 503 also includes laser placement information 540 for the non-horizontal laser 505, including the non-horizontal laser 505's position on the mobile robot 501 and the first laser's tilt angle (both values being relative to the center of the robot, for example). The memory 503 also holds a tolerance profile 545 for use with the positive and negative obstacle avoidance engine 515. As previously stated, the tolerance profile 545 typically includes a ceiling offset, a floor offset, a ceiling adjustment angle and a floor adjustment angle to be used by the positive and negative obstacle avoidance engine 515 to avoid generating too many false positives caused by sloping ceilings or floors, or variations in the position and tilt of the installed laser.

The propulsion system 550 may comprise a combination of hardware, such as motors and wheels 570, and software processors and/or controllers, such as path planning engine 555 and locomotion controller 560, that when executed by a microprocessor on board the mobile robot 501 (the microprocessor is not shown), cause the mobile robot 501 to avoid driving into the locations in the physical environment represented by the coordinates in the data structure of two dimensional coordinates 520. In other words, the propulsion system 550 is typically configured to periodically check the coordinates in the data structure 520 in order to ensure, for example, that no coordinates from the data structure 520 will be used in a path planned by the path planning engine 565. In some embodiments, avoiding the locations in the physical environment represented by the coordinates in the data structure 520 will mean calculating paths around the prohibited locations. In other embodiments, the mobile robot 501 may slow down and/or come to a complete stop if the path to the current destination is blocked by a prohibited location or because proceeding along the intended path would cause the mobile robot 510 to drive into a gap in the floor.

Figure 9:
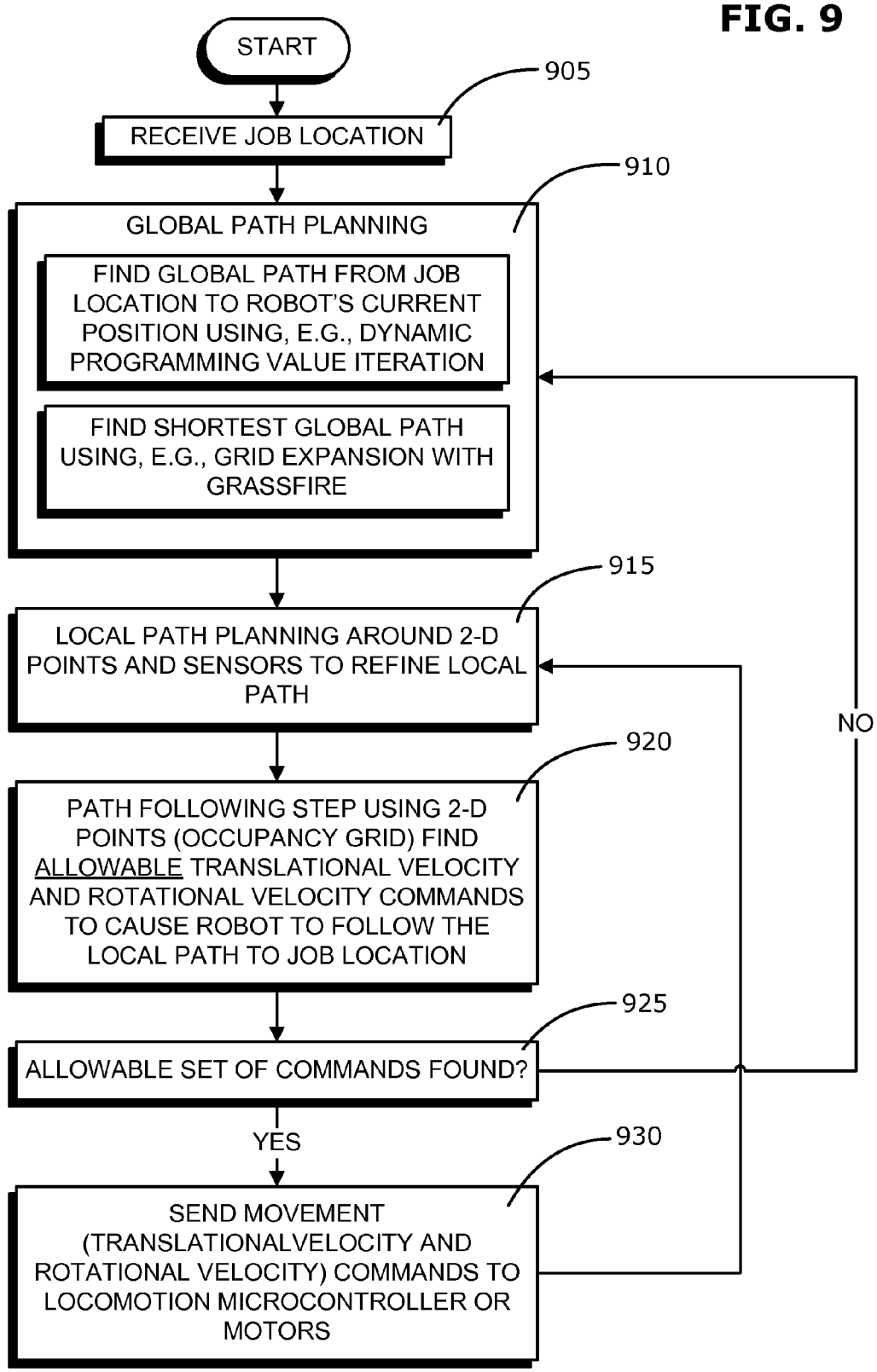
FIG. 9 illustrates, by way of example only, a known algorithm a mobile robot might use to plan a path between the mobile robot's current position and a particular location in accordance with a map.

As shown in FIG. 5, the propulsion system 550 may optionally include a path planning engine 565, which determines, in accordance with the map 530 and the floor plan 535 for the physical environment, an optimum path the mobile robot 501 should take to travel from its current position in the physical environment to a specified location. A variety of different path planning techniques are known and used by those skilled in the art to accomplish such path planning for mobile robots. FIG. 9, discussed below, shows a high-level flow diagram illustrating, by way of example, the steps that might be performed by one such path planning engine encompassed by the propulsion system 550. Another path planning technique is discussed in detail in Chapter 7 of the book "Artificial Intelligence and Mobile Robots," First Edition, published in 1998 by AAAI Press, and edited by David Kortenkamp, R. Peter Bonnaso and Robin Murphy. For purposes of the present invention, the path planning engine 555 plans a path that avoids all of the locations that have been identified by the positive and negative obstacle avoidance engine 515 as containing obstacles.

Figure 7:
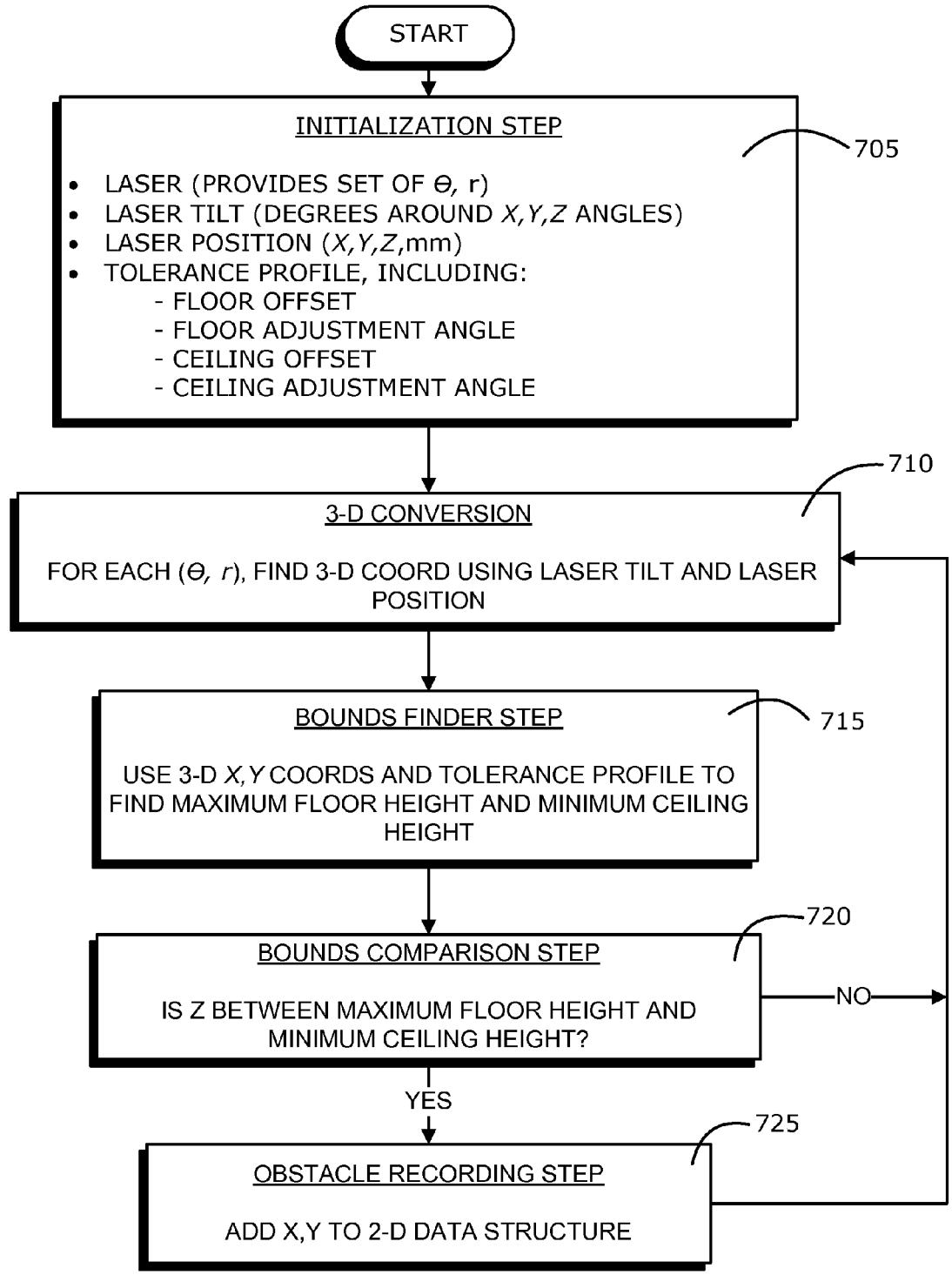
FIG. 7 shows a high-level flow diagram illustrating steps that may be performed by a positive and negative obstacle avoidance system, like the one shown in FIG. 5, operating in accordance with embodiments of the present invention to determine the locations of positive obstacles in the physical environment.

FIG. 7 shows a high-level flow diagram illustrating steps that may be performed by a positive and negative obstacle avoidance system, like the one shown in FIG. 5, operating in accordance with embodiments of the present invention to determine the locations of positive obstacles in the physical environment. As shown in FIG. 7, the first step, step 705, comprises receiving angle and distance information (theta and r) from the non-horizontal laser 505 and non-horizontal laser controller 510. Step 705 in FIG. 7 also includes initializing certain operating parameters for the positive and negative obstacle avoidance engine 515. The remaining steps 710 through 725 are performed by the positive and negative obstacle avoidance engine 515 to populate the data structure of two-dimensional coordinates 520 with two-dimensional coordinates representing locations in the physical environment that need to be avoided.

More specifically, in step 710, the positive and negative obstacle avoidance engine 515 converts the laser reading (theta and r) obtained in step 705 into a three-dimensional coordinate (x, y, z) based on the first plane angle (theta), the first plane distance (r), the first laser position and said first laser tilt stored in the memory 503 at step 705. The three-dimensional coordinate includes an x-component, a y-component and a z-component. As discussed above, the first laser may be attached to the mobile robot in a variety of different orientations. But when the first laser's scanning plane is perpendicular to the floor and parallel to the direction of the mobile robot's direction of travel, the positive obstacle avoidance engine is programmed to convert the laser readings into a three-dimensional coordinate (x, y, z) using the formulas:

$x$-component=first laser $x$ position+first plane distance*cosine(first plane angle), $y$-component=first laser $y$ position, and $z$-component=first laser $z$ position+first plane distance*sin(first plane angle).

Next, at step 715, the positive obstacle avoidance engine 515 determines a maximum floor height and a minimum ceiling height for the three-dimensional coordinate based on the x-component, the y-component and the tolerance profile 545 stored in the memory 503. As previously stated, the maximum floor height may be calculated according to the formula:

maximum floor height=floor offset+$A$*sin(floor adjustment angle), where A=the distance from the current position to the coordinate (x-component, y-component) in the two-dimensional coordinate system. The minimum ceiling height may be calculated according to the formula:

minimum ceiling height=ceiling offset+$A$*sin(ceiling adjustment angle), where A=the distance from the current position to the coordinate (x-component, y-component) in the two-dimensional coordinate system.

Next, at step 720, the positive and negative obstacle avoidance engine 515 determines whether the z-component is between the minimum ceiling height and the maximum floor height. If it is, then the positive and negative obstacle avoidance engine construes this as an indication that the location is occupied by a positive obstacle suspended above the floor, such as the horizontal component of a table, a keyboard tray extending out of a desk or workstation, or possibly some other cantilevered object. Accordingly, at step 725, the positive obstacle avoidance engine 515 will then add the x-component and the y-component of the three-dimensional coordinate (representing the spot on the floor below the table, keyboard tray or other object) to the first data structure of two-dimensional coordinates to represent a new location in the physical environment to be avoided by the mobile robot. If there are more distance and angle readings from the non-horizontal laser, then execution returns to step 710, upon which the next three-dimensional coordinate is processed. In this fashion, the positive obstacle avoidance engine builds the data structure of two-dimensional coordinates (or adds new two-dimensional coordinates to a previously-existing data structure) that identifies all of the locations on the floor plan where a positive obstacle has been found. Notably, the data structure of two dimensional coordinates built by the positive and negative obstacle avoidance system may also contain coordinates for obstacles that were found, or could also be found, by a horizontally-oriented laser on the mobile robot. In other words, the positive and negative obstacle avoidance system may be configured to operate completely independently from the operation of other obstacle avoidance systems tied, for example, to a horizontally-oriented later on the mobile robot.

Figure 8:
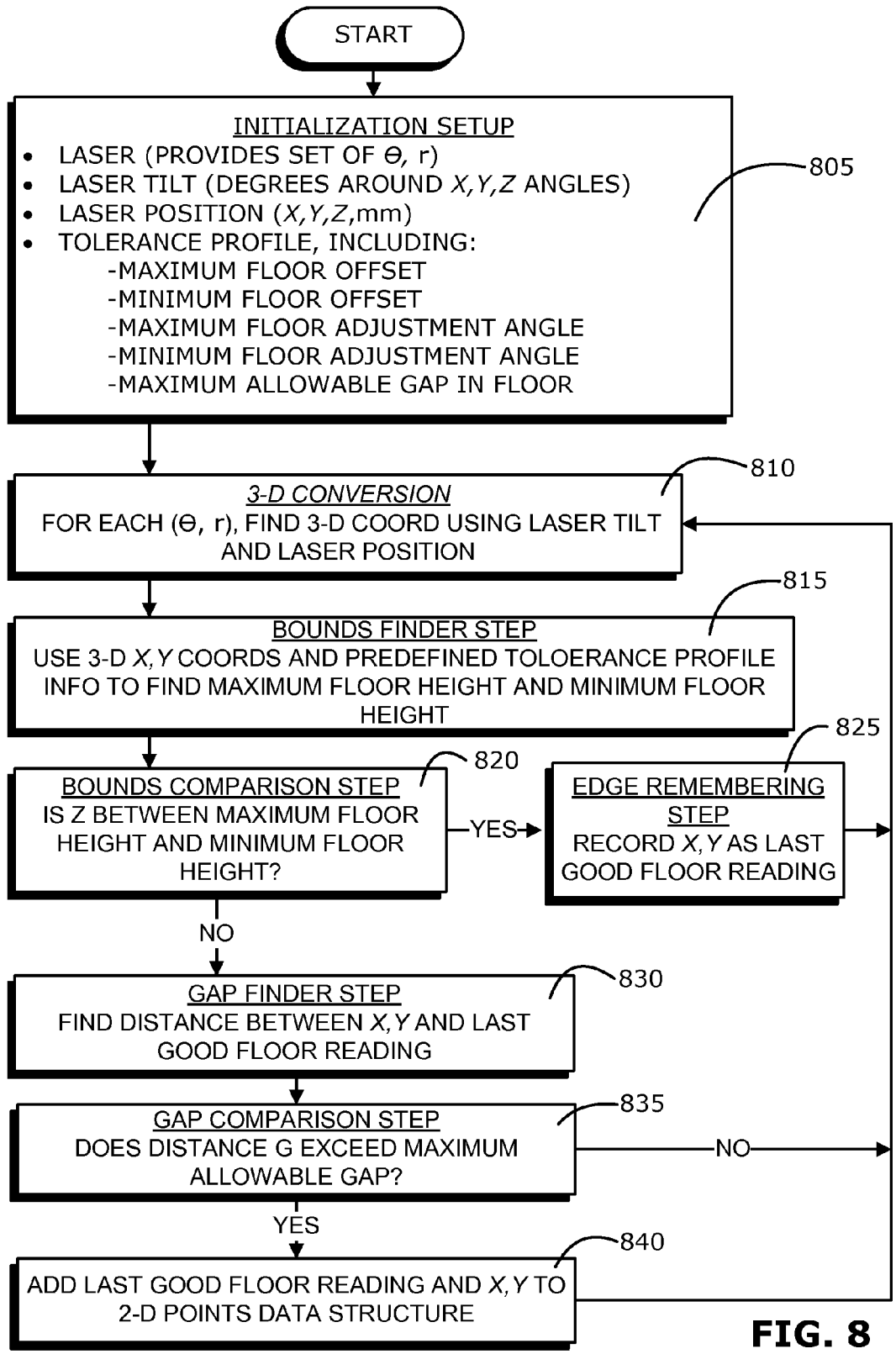
FIG. 8 shows a high-level flow diagram illustrating steps that may be performed by a positive and negative obstacle avoidance system, like the one shown in FIG. 5, operating in accordance with embodiments of the present invention to determine the locations of negative obstacles in the physical environment.

FIG. 8 shows a high-level flow diagram illustrating steps that may be performed by a positive and negative obstacle avoidance system, like the one shown in FIG. 5, operating in accordance with embodiments of the present invention to determine the locations of negative obstacles in the physical environment. First, in step 805, laser readings are received from the non-horizontal laser 505 and the non-horizontal laser controller 510. Also in this step, a set of initial operating parameters and preferences for use by the positive and negative obstacle avoidance engine 515 is stored in the memory, including laser placement information for the non-horizontal laser, including a first laser position and a first laser tilt, and a tolerance profile 545 comprising a maximum floor offset, a minimum floor offset, a maximum floor adjustment angle, a minimum floor adjustment angle and a maximum allowable floor gap.

Then, in step 810, the positive and negative obstacle avoidance engine converts each laser reading into a three-dimensional coordinate based on the first plane angle, the first plane distance, the first laser position and the first laser tilt. Next, at step 815, the negative obstacle avoidance engine determines a maximum allowable floor height and a minimum allowable floor height for the three-dimensional coordinate based on the x-component, the y-component and the tolerance profile, and determines in step 820 whether the z-component falls between the maximum allowable floor height and the minimum allowable floor height. If it does, the positive and negative obstacle avoidance engine 515 changes an indicator, such as a flag, in the memory to designate the x-component and the y-component of the three-dimensional coordinate as the coordinate corresponding to the last good floor reading (step 825). On the other hand, if the z-component does not fall between the maximum allowable floor height and the minimum allowable floor height, then, in steps 830 and 835, the positive and negative obstacle avoidance engine 515 determines whether the distance G between the last good floor reading coordinate and the location in the two-dimensional coordinate system defined by the x-component and the y-component exceeds the maximum allowable floor gap stored in the memory 503. If the distance G exceeds the maximum allowable floor gap, the positive and negative obstacle avoidance engine 515 adds the x-component, the y-component and the last good floor reading coordinate to the data structure 520 of two-dimensional coordinates to represent another location in the physical environment to be avoided by the mobile robot 501 (step 840). When all of the non-horizontal laser readings are processed, positive and negative obstacle avoidance engine will have populated the data structure 520 with a list of coordinates that need to be avoided. This information may then be used by a path planning engine, an autonavigation engine, or both.

FIG. 9 illustrates, by way of example only, a known algorithm a mobile robot might use to plan a path between the mobile robot's current position and a particular location in accordance with a map and a floor plan delineated by a two-dimensional coordinate system. In general, the steps of the path planning algorithm include receiving the job location (step 905), planning a global path to the job location (step 910), planning a local path around detected and remembered obstacles (step 915), finding an allowable set of movement commands for the mobile robot in order to follow the path (step 925) and sending the movement commands to a locomotion controller or motors (step 930).

Although the exemplary embodiments, uses and advantages of the invention have been disclosed above with a certain degree of particularity, it will be apparent to those skilled in the art upon consideration of this specification and practice of the invention as disclosed herein that alterations and modifications can be made without departing from the spirit or the scope of the invention, which are intended to be limited only by the following claims and equivalents thereof.

We claim:

1. In a mobile robot comprising a memory and a propulsion system, a method for avoiding positive obstacles in a physical environment, the method comprising:
 a) storing in the memory
  (i) a map defining a floor plan representing the physical environment and a two dimensional coordinate system delineating the floor plan,
  (ii) a first data structure of two-dimensional coordinates from the floor plan, the two-dimensional coordinates in the first data structure representing locations in the physical environment to be avoided by the mobile robot,
  (iii) first laser placement information for a first laser attached to the mobile robot, said first laser being oriented to scan the physical environment in a first plane that is not parallel to the floor of the physical environment, wherein said first laser placement information includes a first laser position and a first laser tilt, and
  (iv) a tolerance profile comprising a ceiling offset, a floor offset, a ceiling adjustment angle and a floor adjustment angle,
 b) receiving a set of laser readings from said first laser, each laser reading corresponding to a location in the physical environment where said first laser detects a physical obstacle in said first plane, and each laser reading comprising a first plane angle and a first plane distance from a given site on the mobile robot;
 c) for each laser reading in said set of laser readings
  (i) converting said each laser reading into a three-dimensional coordinate based on said first plane angle, said first plane distance, said first laser position and said first laser tilt, wherein said three-dimensional coordinate comprises an x-component, a y-component and a z-component,
  (ii) determining a minimum ceiling height and a maximum floor height for the three dimensional coordinate based on the x-component, the y-component and the tolerance profile, and
  (iii) if the z-component is between the minimum ceiling height and the maximum floor height, adding the x-component and the y-component to the first data structure of two-dimensional coordinates to represent a new location in the physical environment to be avoided by the mobile robot; and
 d) causing the propulsion system to drive the mobile robot in the physical environment under control of the first data structure, wherein the propulsion system prevents the mobile robot from passing into the locations in the physical environment represented by the two-dimensional coordinates in the first data structure.

2. The method of claim 1, further comprising:
 a) receiving on the mobile robot a command to move from a current position to a specified location in the physical environment;
 b) calculating on the mobile robot, in accordance with the floor plan, a path between said current position and said specified location, said path avoiding the locations in the physical environment represented by the first data structure of two-dimensional coordinates; and
 c) activating the propulsion system to automatically drive the mobile robot along the path.

3. The method of claim 1, wherein said first plane is perpendicular to the floor of the physical environment.

4. The method of claim 1, wherein said maximum floor height is calculated by using the formula:

maximum floor height=floor offset+$A$*sin(floor adjustment angle), wherein, A=the distance from the current position to the coordinate (x-component, y-component) in the two-dimensional coordinate system.

5. The method of claim 1, wherein said minimum ceiling height is calculated according to the formula:

minimum ceiling height=ceiling offset+$A$*sin(ceiling adjustment angle), wherein, A=the distance from the current position to the coordinate (x-component, y-component) in the two-dimensional coordinate system.

6. The method of claim 1, further comprising:
 a) storing in the memory
  (i) a second data structure of two-dimensional coordinates from the floor plan, the two dimensional coordinates in the second data structure representing locations in the physical environment to be avoided by the mobile robot,
  (ii) second laser placement information for a second laser attached to the mobile robot, said second laser being oriented to scan the physical environment in a second plane that is not parallel to the floor of the physical environment, wherein said second laser placement information includes a second laser position and a second laser tilt, and
  (iii) receiving a second set of laser readings from said second laser, each laser reading corresponding to a location in the physical environment where said second laser detects a physical obstacle in said second plane, and each laser reading comprising a second plane angle and a second plane distance from a given site on the mobile robot;
 b) for each laser reading in said second set of laser readings
  (i) converting said each laser reading into a second three-dimensional coordinate based on said second plane angle, said second plane distance, said second laser position and said second laser tilt, wherein said second three-dimensional coordinate comprises a second x-component, a second y-component and a second z-component, (ii) determining a minimum ceiling height and a maximum floor height for the second three-dimensional coordinate based on the second x-component, the second y-component and the tolerance profile, and (iii) if the second z-component is between the maximum floor height and the minimum ceiling height, adding the second x-component and the second y-component to the second data structure of two-dimensional coordinates to represent another location in the physical environment to be avoided by the mobile robot; and c) causing the propulsion system to drive the mobile robot in the physical environment under control of the first data structure and the second data structure, wherein the propulsion system prevents the mobile robot from passing into the locations in the physical environment represented by the two-dimensional coordinates in both the first data structure and the second data structure.

7. The method of claim 6, further comprising:
a) receiving on the mobile robot a command to move from a current position to a specified location in the physical environment;
b) calculating on the mobile robot, in accordance with the floor plan, a path between said current position and said specified location, said path avoiding the locations in the physical environment represented by the first data structure of two-dimensional coordinates and the second data structure of two-dimensional coordinates; and
c) activating the propulsion system to automatically drive the mobile robot along the path.

8. The method of claim 6, wherein said second plane is perpendicular to the floor of the physical environment.

9. In a mobile robot comprising a memory and a propulsion system, a method for avoiding negative obstacles in a physical environment, the method comprising:
a) storing in the memory
(i) a map defining a floor plan representing the physical environment and a two dimensional coordinate system delineating the floor plan,
(ii) a first data structure of two-dimensional coordinates from the floor plan, the two dimensional coordinates in the first data structure representing locations in the physical environment to be avoided by the mobile robot,
(iii) first laser placement information for a first laser attached to the mobile robot, said first laser being oriented to scan the physical environment in a first plane that is not parallel to the floor of the physical environment, wherein said first laser placement information includes a first laser position and a first laser tilt, and
(iv) a tolerance profile comprising a maximum floor offset, a minimum floor offset, a maximum floor adjustment angle, a minimum floor adjustment angle and a maximum allowable floor gap,
b) receiving a set of laser readings from said first laser, each laser reading corresponding to a location in the physical environment within said first plane, and each laser reading comprising a first plane angle and a first plane distance from a given site on the mobile robot;
c) for each laser reading in said set of laser readings
(i) converting said each laser reading into a three-dimensional coordinate based on said first plane angle, said first plane distance, said first laser position and said first laser tilt, wherein said three-dimensional coordinate comprises an x-component, a y-component and a z-component, (ii) determining a maximum floor height and a minimum floor height for the three-dimensional coordinate based on the x-component, the y-component and the tolerance profile, and (iii) if the z-component is between the maximum floor height and the minimum floor/height, changing an indicator in the memory to designate the x-component and the y-component of the three-dimensional coordinate as the last good floor reading, (iv) if the z-component is not between the maximum floor height and the minimum floor height, determining whether the distance G between the last good floor reading and the location in the two-dimensional coordinate system defined by the x-component and the y-component exceeds the maximum allowable floor gap, and (v) if the distance G exceeds the maximum allowable floor gap, adding the x-component, the y-component and the last good floor reading to the first data structure of two-dimensional coordinates to represent a new location in the physical environment to be avoided by the mobile robot;

d) causing the propulsion system to drive the mobile robot in the physical environment under control of the first data structure, wherein the propulsion system prevents the mobile robot from passing into the locations in the physical environment represented by the two-dimensional coordinates in the first data structure.

10. The method of claim 9, further comprising:
a) receiving on the mobile robot a command to move from a current position to a specified location in the physical environment;
b) calculating on the mobile robot, in accordance with the floor plan, a path between said current position and said specified location, said path avoiding the locations in the physical environment represented by the first data structure of two-dimensional coordinates; and
c) activating the propulsion system to automatically drive the mobile robot along the path.

11. The method of claim 9, wherein said first plane is perpendicular to the floor of the physical environment.

12. The method of claim 9, wherein said maximum floor height is calculated by using the formula:

$$\text{maximum floor height} = \text{floor offset} + A*\sin(\text{floor adjustment angle}),$$

wherein, A=the distance from the current position to the coordinate (x-component, y-component) in the two-dimensional coordinate system.

13. The method of claim 9, wherein said minimum floor height is calculated according to the formula:

$$\text{minimum floor height} = -\text{floor offset} - A*\sin(\text{floor adjustment angle}),$$

wherein, A=the distance from the current position to the coordinate (x-component, y-component) in the two-dimensional coordinate system.

14. A positive obstacle avoidance system for use with a mobile robot in a physical environment, comprising:
a) a first laser attached to the mobile robot, said first laser being oriented to scan the physical environment in a first plane that is not parallel to the floor of the physical environment;
b) a memory for storing
(i) a map defining a floor plan representing the physical environment and a two dimensional coordinate system delineating the floor plan, (ii) a first data structure of two-dimensional coordinates from the floor plan, each two dimensional coordinate in the first data structure representing a location in the physical environment to be avoided by the mobile robot, (iii) first laser placement information for said first laser, said first laser placement information including a first laser position and a first laser tilt, and (iv) a tolerance profile comprising a ceiling offset, a floor offset, a ceiling adjustment angle and a floor adjustment angle, c) a laser controller for receiving a set of laser readings from said first laser, each laser reading corresponding to a location in the physical environment where said first laser detects a physical obstacle in said first plane, and each laser reading comprising a first plane angle and a first plane distance from a given site on the mobile robot;

d) a positive obstacle avoidance engine that, for each laser reading in said set of laser readings (i) converts said each laser reading into a three-dimensional coordinate based on said first plane angle, said first plane distance, said first laser position and said first laser tilt, wherein said three-dimensional coordinate comprises an x-component, a y-component and a z-component, (ii) determines a minimum ceiling height and a maximum floor height for the three dimensional coordinate based on the x-component, the y-component and the tolerance profile, and (iii) if the z-component is between the minimum ceiling height and the maximum floor height, adds the x-component and the y-component to the first data structure of two-dimensional coordinates to represent a new location in the physical environment to be avoided by the mobile robot; and e) a propulsion system that drives the mobile robot in the physical environment under control of the first data structure, the propulsion system being configured to prevent the mobile robot from passing into the locations in the physical environment represented by the two-dimensional coordinates in the first data structure.

15. The system of claim 14, further comprising:

a) a communication interface that receives a command to move from a current position to a specified location in the physical environment; and b) a path planning engine that calculates, in accordance with the floor plan, a path between said current position and said specified location, said path avoiding the locations in the physical environment represented by the first data structure of two-dimensional coordinates;

c) wherein the propulsion system is further configured to automatically drive the mobile robot along the path.

16. The system of claim 14, wherein said first plane is perpendicular to the floor of the physical environment.

17. The system of claim 14, wherein said positive obstacle avoidance engine calculates the maximum floor height according to the formula:

$$\text{maximum floor height} = \text{floor offset} + A*\sin(\text{floor adjustment angle}),$$

wherein, A=the distance from the current position to the coordinate (x-component, y-component) in the two-dimensional coordinate system.

18. The system of claim 14, wherein said positive obstacle avoidance engine calculates the minimum ceiling height according to the formula:

$$\text{minimum ceiling height} = \text{ceiling offset} + A*\sin(\text{ceiling adjustment angle}),$$

wherein, A=the distance from the current position to the coordinate (x-component, y-component) in the two-dimensional coordinate system.

19. The system of claim 14, wherein:

a) a second laser is attached to the mobile robot, said second laser being oriented to scan the physical environment in a second plane that is not parallel to the floor of the physical environment;

b) the memory further comprises (i) a second data structure of two-dimensional coordinates from the floor plan, each two dimensional coordinate in the second data structure representing another location in the physical environment to be avoided by the mobile robot, (ii) second laser placement information for said second laser, said second laser placement information including a second laser position and a second laser tilt, and c) the laser controller receives a second set of laser readings from said second laser, each laser reading corresponding to a location in the physical environment where said second laser detects a physical obstacle in said second plane, and each laser reading comprising a second plane angle and a second plane distance from a given site on the mobile robot;

d) the positive obstacle avoidance engine, for each laser reading in said second set of laser readings (iii) converts said each laser reading into a second three-dimensional coordinate based on said second plane angle, said second plane distance, said second laser position and said second laser tilt, wherein said second three-dimensional coordinate comprises a second x-component, a second y-component and a second z component, (iv) determines a minimum ceiling height and a maximum floor height for the second three-dimensional coordinate based on the second x-component, the second y component and the tolerance profile, and (v) if the second z-component is between the maximum floor height and the minimum ceiling height, adds the second x-component and the second y-component to the second data structure of two-dimensional coordinates to represent another location in the physical environment to be avoided by the mobile robot; and e) the propulsion system drives the mobile robot in the physical environment under control of the first data structure and the second data structure, whereby the propulsion system prevents the mobile robot from passing into the locations in the physical environment represented by the two-dimensional coordinates in both the first data structure and the second data structure.

20. The system of claim 19, further comprising:

a) a communication interface that receives a command to move from a current position to a specified location in the physical environment; and b) a path planning engine that calculates, in accordance with the floor plan, a path between said current position and said specified location, said path avoiding the locations in the physical environment represented by the first data structure of two-dimensional coordinates;

c) wherein the propulsion system is further configured to automatically drive the mobile robot along the path.

21. The system of claim 19, wherein said second plane is perpendicular to the floor of the physical environment.

22. A negative obstacle avoidance system for use with a mobile robot in a physical environment, comprising:
   a) a first laser attached to the mobile robot, said first laser being oriented to scan the physical environment in a first plane that is not parallel to the floor of the physical environment;
   b) a memory for storing
      (i) a map defining a floor plan representing the physical environment and a two dimensional coordinate system delineating the floor plan,
      (ii) a first data structure of two-dimensional coordinates from the floor plan, the two dimensional coordinates in the first data structure representing locations in the physical environment to be avoided by the mobile robot,
      (iii) first laser placement information for said first laser, the first laser placement information including a first laser position and a first laser tilt, and
      (iv) a tolerance profile comprising a maximum floor offset, a minimum floor offset, a maximum floor adjustment angle, a minimum floor adjustment angle and a maximum allowable floor gap,
   c) a laser controller for receiving a set of laser readings from said first laser, each laser reading corresponding to a location in the physical environment within said first plane, and each laser reading comprising a first plane angle and a first plane distance from a given site on the mobile robot; and
   d) a negative obstacle avoidance engine that, for each laser reading in said set of laser readings
      (i) converts said each laser reading into a three-dimensional coordinate based on said first plane angle, said first plane distance, said first laser position and said first laser tilt, wherein said three-dimensional coordinate comprises an x-component, a y-component and a z-component,
      (ii) determines a maximum floor height and a minimum floor height for the three dimensional coordinate based on the x-component, the y-component and the tolerance profile, and
      (iii) if the z-component is between the maximum floor height and the minimum floor height, changes an indicator in the memory to designate the x-component and the y-component of the three-dimensional coordinate as the last good floor reading coordinate,
      (iv) if the z-component is not between the maximum floor height and the minimum floor height, determines whether the distance G between the last good floor reading coordinate and the location in the two-dimensional coordinate system defined by the x-component and the y-component exceeds the maximum allowable floor gap, and
      (v) if the distance G exceeds the maximum allowable floor gap, adds the x-component, the y-component and the last good floor reading coordinate to the first data structure of two-dimensional coordinates to represent another location in the physical environment to be avoided by the mobile robot; and
   e) a propulsion system that drives the mobile robot in the physical environment under control of the first data structure, the propulsion system being configured to prevent the mobile robot from passing into the locations in the physical environment represented by the two-dimensional coordinates in the first data structure.

23. The system of claim 22, further comprising:
   a) a communication interface that receives a command to move from a current position to a specified location in the physical environment; and
   b) a path planning engine that calculates, in accordance with the floor plan, a path between said current position and said specified location, said path avoiding the locations in the physical environment represented by the first data structure of two-dimensional coordinates;
   c) wherein the propulsion system is further configured to automatically drive the mobile robot along the path.

24. The system of claim 22, wherein said first plane is perpendicular to the floor of the physical environment.

25. The system of claim 22, wherein the negative obstacle avoidance engine calculates said maximum floor height by using the formula:

$$\text{maximum floor height} = \text{floor offset} + A*\sin(\text{floor adjustment angle}),$$

wherein, $A$ = the distance from the current position to the coordinate (x-component, y-component) in the two-dimensional coordinate system.

26. The system of claim 22, wherein the negative obstacle avoidance engine calculates said minimum floor height according to the formula:

$$\text{minimum floor height} = -\text{floor offset} - A*\sin(\text{floor adjustment angle}),$$

wherein, $A$ = the distance from the current position to the coordinate (x-component, y-component) in the two-dimensional coordinate system.

* * * * *